(12) United States Patent  
Jiang et al.

(10) Patent No.: US 8,610,392 B2
(45) Date of Patent: Dec. 17, 2013

(54) RUNOUT MEASUREMENT FOR DEVICES HAVING A ROTATING BODY

(75) Inventors: Quan Jiang, Singapore (SG); Chao Bi, Singapore (SG); Song Lin, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 324 days.

(21) Appl. No.: 13/132,592

(22) PCT Filed: Dec. 2, 2008

(86) PCT No.: PCT/SG2008/000462
§ 371 (c)(1),
(2), (4) Date: Jun. 2, 2011

(87) PCT Pub. No.: WO2010/064992
PCT Pub. Date: Jun. 10, 2010

(65) Prior Publication Data
US 2011/0239761 A1  Oct. 6, 2011

(51) Int. Cl.
*H02P 1/00* (2006.01)
(52) U.S. Cl.
USPC ............. 318/490; 318/400.13; 318/400.15; 318/400.35; 318/503
(58) Field of Classification Search
USPC ............ 318/400.13, 400.35, 490, 560, 636, 318/400.15, 400.16, 286, 503
See application file for complete search history.

(56) References Cited

U.S. PATENT DOCUMENTS

| | | | |
|---|---|---|---|
| 4,376,970 A * | 3/1983 | Ilseman et al. | 700/56 |
| 4,616,276 A | 10/1986 | Workman | |
| 5,017,845 A * | 5/1991 | Carobolante et al. | 318/400.11 |
| 5,198,735 A * | 3/1993 | Taylor et al. | 318/565 |
| 5,304,907 A * | 4/1994 | Abe et al. | 318/611 |
| 5,602,692 A | 2/1997 | Freitas et al. | |
| 6,879,124 B1 | 4/2005 | Jiang et al. | |
| 7,400,464 B1 | 7/2008 | Katchmart | |
| 7,633,256 B2 * | 12/2009 | Reichert et al. | 318/602 |
| 2008/0192593 A1 | 8/2008 | Lin | |

OTHER PUBLICATIONS

PCT International Search Report for PCT Counterpart Application No. PCT/SG2008/000462 containing Communication relating to the Results of the Partial International Search Report, 2 pgs., (Feb. 25, 2008).

(Continued)

*Primary Examiner* — Bentsu Ro
*Assistant Examiner* — Thai Dinh
(74) *Attorney, Agent, or Firm* — Blakely, Sokoloff, Taylor & Zafman LLP

(57) ABSTRACT

A runout measurement system is proposed for measuring the runout of a moving surface of a device having a rotating body, such as a mass storage device (100) (e.g. a hard disk drive) having a rotor which in use includes a rotating recording medium. A sensor (102) interacting with the moving surface obtains a displacement signal. The displacement signal is sampled by a sampling unit (104) controlled by a unit (109) which initiates sampling based on both a signal indicating a ZCP and the clock signal of a high frequency (e.g. 20 MHz) clock (106). Simultaneously, the same clock (106) is used by a counter 108 to measure the spacing between one or more ZCP times. This permits the correspondence between the sampling times and the angular position of the rotor to be found with a high accuracy which depends upon the clock frequency, and thereby allows calculation of repeatable runout (RRO) and non-repeatable runout (NRRO).

17 Claims, 19 Drawing Sheets

(56) References Cited

OTHER PUBLICATIONS

PCT Written Opinion of the International Searching Authority for PCT Counterpart No. PCT/SG2008/000462, 3 pgs., (Feb. 25, 2008).

PCT International Preliminary Report on Patentability (Chapter I of the Patent Cooperation Treaty) for PCT Counterpart Application No. PCT/SG2008/000462, 4 pgs., (Jun. 7, 2011).

\* cited by examiner

PRIOR ART

RUNOUT MEASUREMENT FOR DEVICES HAVING A ROTATING BODY

CROSS-REFERENCE TO RELATED APPLICATION

This patent application is a U.S. National Phase application under 35 U.S.C. §371 of International Application No. PCT/SG2008/000462, filed Dec. 2, 2008, entitled RUNOUT MEASUREMENT FOR DEVICES HAVING A ROTATING BODY.

FIELD OF THE INVENTION

The present invention relates to methods and apparatus for runout measurement for devices comprising a rotating body. It is particularly suitable for use in a mass data storage device, such as a hard disk drive or optical data storage system, having a rotating body which includes or carries a rotating recording medium. For example, it relates to runout measurement for Hard Disk Drives (HDD) having one or more spindle platters driven by a spindle motor and carrying disks of magnetic material.

BACKGROUND OF THE INVENTION

In a data storage device having a disk-shaped rotating recording medium, the surface of the disk is divided into many concentric data tracks and every track is separated into many sectors or segments. An example of such a data storage device is a HDD typically spun by a spindle motor. In the case of a HDD, "runout" is defined as the departure of the movement of a spindle motor or spinning disk segment from ideal circular motion. Due to fabricating precision limitations, such as bearing tolerances, rotor eccentricity, and unbalanced mass, runout inevitably exists in all spindles. FIG. 1 illustrates this for a typical spindle platter. FIG. 1($a$) shows by the arc $S_i$ the points on the disk surface which constitute the i-th disk segment, including a centre point $P_i$, when the disk has a radial motion indicated as $\omega_r$. FIG. 1($b$) shows by a dashed line ideal circular motion as the spindle platter performs a complete rotation, and the solid line indicates the actual motion of the point $P_i$. FIG. 1($c$) shows by the solid lines the motion of the point $P_i$ during multiple rotations.

As the disk spins, each segment of the track circumference on disk surface travels underneath one or more read/write heads. In a hard disk drive, there are two sorts of runouts: radial and axial runouts. Radial runout is defined as the radial variation in the distance between the read/write head and the ideal circular as shown in FIG. 2. FIG. 2($a$) shows the spatial relation of the spindle platter and the read/write head, with the dashed line showing many segments. FIG. 2($b$) shows the runout during multiple rotations of the spindle patter. The displacement of each segment centre point from the ideal concentric circular is defined as the radial runout in IDEMA standards. For a specific track where the read/write head is positioned, the radial runout of the $i^{th}$ segment can be expressed as:

$$dr(i,j)|_{r_e} = r_{P_i}^j(\theta_i) - r_e \quad (1)$$

where $P_i$ is the center point of the $i^{th}$ segment, the variable $r_{P_i}$ is its radius value in polar coordinates, the variable $r_c$ is the radius of the ideal circle of the detected track, the variable $\theta_i$ is the angular of the center point, $P_i$, of the $i^{th}$ segment and the index j denotes the $j^{th}$ revolution the disk has spun.

At the same time, there exists the axial runout which is defined as variations in the distance between the head and the disk surface. The axial runout is caused mainly by the surface profile of the disk and the bearing floating height. Large and fast axial runout usually increases the risk of a head crash. For a specific track where the read/write head is positioned, the axial runout of the $i^{th}$ segment can be expressed as:

$$dz(i,j)|_{r_e} = z_{P_i}^j(\theta_i, r_{P_i}^j) - z_c(r_c) \quad (2)$$

where the variable $z_P$ is the z-axial value of the detected segment in three-dimensional polar coordinates and $z_c$ is the z-axial value of the ideal circle at the radius $r_c$.

Measurement of radial and axial runouts is critical in the hard disk drive industry. As a disk rotates, the read/write heads must be positioned at a specific radius in order to read or write the data from/to a selected track. Data written at a track segment of a disk surface will not be read properly if the location of the track segment appears at a different radial location relative to the head position system. Since these radial and axial runout orbits do not repeat themselves in each revolution, the total indicated runouts (TIR) are the sum of two components, i.e., repeatable runout (RRO) and non-repeatable runout (NRRO). The RRO component happens synchronously with the rotor angular position in each revolution and the NRRO component is different in each revolution even at the same angular position of the rotor.

According to IDEMA standard T17-91 and ANSI/ASME B89.3.4M, the radial and axial RRO and NRRO during N revolutions can be expressed as following equations.

a) Radial RRO:

$$RRO_r(i) = \frac{1}{N}\sum_{j=1}^{N} dr(i,j) = \frac{1}{N}\sum_{j=1}^{N}[r_{P_i}^j(\theta_i) - r_c] \quad (3)$$

b) Radial NRRO:

$$NRRO_r(i,j) = r_{P_i}^j(\theta_i) - \frac{1}{N}\sum_{j=1}^{N} r_{P_i}^j(\theta_i) \quad (4)$$

c) Axial RRO:

$$RRO_z(i) = \frac{1}{N}\sum_{j=1}^{N} dz(i,j) = \frac{1}{N}\sum_{j=1}^{N}[z_{P_i}^j(\theta_i) - z_c(r_c)] \quad (5)$$

d) Axial NRRO:

$$NRRO_z(i,j) = z_{P_i}^j(\theta_i, r_{P_i}^j) - \frac{1}{N}\sum_{j=1}^{N} z_{P_i}^j(\theta_i, r_{P_i}^j) \quad (6)$$

With a proper control algorithm, the radial RRO component can be predicted, and compensated for in advance during the track seeking and following. But the NRRO cannot be predicted from one revolution to the next. The consequence of radial NRRO is track-mix registration (TMR). It causes non-compensable or uncorrectable TMR and off-track read/write errors in hard disk drives, which is a key factor to influence the track and areal densities of HDDs. How well a spindle motor or a spinning disk can repeat its path over many revolutions, i.e., how much the NRRO is, dictates a physical limitation on the track width or the track density.

As HDD areal density increases, track widths become smaller and the NRRO needs to be smaller too. Now the manufacturers of the high areal density HDDs are looking for more accurate and higher resolution runout measurements of spinning spindle motors and media platters in both axial and radial directions. With the areal density approaching 150

GB/in² (23.2 GB/cm²), the track density increases to 400K TPI (tracks per inch) (160 tracks/cm), the spindle motors and assembly disks must be fabricated with the stricter runout control. Therefore the PES signal is not degraded too much and the flying distance between the read/write heads and the media does not vary too dramatically. Currently, HDD manufacturers seek 1 nanometer resolution and accuracy, but no such system is available in the market to meet this high performance requirement.

In past, several kinds of runout measurement systems for HDD have been developed. As implied in Eqs. (1) to (6), the angular position of the rotor circumference segments must be known for each sample of the signal from the sensor which detects the position of the moving surface (here referred to as the "displacement sensor", and its output as the "displacement signal"), and the first generation of runout measurement instruments usually employed an encoder to detect the angular position of the rotor. In one version, the rotor included markings which could be optically detected using an optical sensor. The output of the optical sensor, and of the displacement sensor(s) (typically capacitance sensors) measuring respectively radial and axial displacements of the rotor, were processed using an oscilloscope, which gave an input to a processor. In another arrangement, pulses generated by a photodetector by observing slits on the rotor were used to control generation of pulses which were fed to the motor to control its speed, and also fed to a processor which received a displacement signal from proximity probes measuring displacement of the disks.

However, currently all HDDs have adopted sensorless technology to control spindle motors without encoders: the processor which drives the motor does so by generating a pulsed index signal (square wave). This technology is also used in the runout measurement system for HDDs: the processor measures runout using knowledge of the timing of the index signal, together with the output of capacitance proximity sensors(s) measuring displacements of the rotor. In the market, there are several kinds of runout measurement systems used in hard disk drive industry.

The advantage of using a capacitance probe is that it can measure the absolute distance between its sensor and the tested target. However, a capacitance probe based system has several drawbacks. Firstly its sensor diameter is large; the diameter of the best available capacitance sensor is 500 microns, whereas the width of a HDD track is 0.15 microns. Secondly, its resolution is 5 nanometers for 100 KHz, which is not good enough for high frequency runout signal, such as 64 KHz (250 Hz×256 segment for 15K rpm HDDs), when 1 nanometer resolution is required. Thirdly, the best linearity is 0.25% which will cause a 25 nm error in a 10 microns runout measurement. Fourthly, the detecting distance between the sensor and the target circumference is limited to 50-100 microns for high resolution. This causes great difficulty in setting up the system to avoid a crash of the capacitance sensor and the recording media surface.

Another type of displacement sensor is a Laser Doppler Vibrometer which can measure the relative distance or the relative displacement between the sensor and the tested targeted. The advantages of a Laser Doppler Vibrometer are that it has a very small tested spot of 16 microns, high resolution of 0.1-1 nm even at 100 KHz, good linearity of 0.1%, excellent accuracy of 0.2% in a wide range, and can be operated far away from the tested target. The disadvantages are that there is a low frequency drift, and the sensor is sensitive to the roughness of the rotating tested surface. However, when high accuracy of HDD runout measurement is required, the LDV technology is the only qualified candidate at moment.

Since all HDDs adopt fluid dynamical bearings, the RRO is about 200 times the NRRO component. It means that if there is any very small error of the rotor position detection, the NRRO will be added to by a big error. Therefore, when it is needed to measure runout with high accuracy, in particular NRRO measurement, the rotor position must be measured with high accurate and resolution. Here "resolution" refers to the nominal accuracy of position measurement, and "accuracy" refers to total error.

If the rotating speed is constant, the sampling interval of the index signal can be translated to the angular position of the rotor. The maximum possible measurement error of NRRO, which is caused by both the sampling interval and the rotor position error, will be:

$$e_{NRRO} \leq d_{RRO}\left(\left\|\frac{n}{60} \times t_s\right\| + \left\|\frac{\Delta\theta_{err}}{2\pi}\right\|\right) \quad (7)$$

where $d_{RRO}$ is the actual peak-to-peak repeatable runout, n is the speed in rpm, $t_s$ is the sampling interval and $\Delta\theta_{err}$ is the maximum error of position index per revolution. Therefore, the relative error is:

$$e_{NRRO}(\%) \leq 100\left(\left\|\frac{n}{60} \times t_s\right\| + \left\|\frac{\Delta\theta_{err}}{2\pi}\right\|\right)\% = 100\left(\left\|\frac{n}{60 \times f_s}\right\| + \left\|\frac{\Delta\theta_{err}}{2\pi}\right\|\right)\% \quad (8)$$

where $f_s$ is the sampling rate per signal channel.

From equation (8), both the detection of the rotor position and the sampling interval can cause additional errors to NRRO measurement. Conventionally, the sensorless rotor position detection of HDDs provides a once per-revolution pulse. From this pulse, a phase-locked loop (PLL) frequency multiplier is applied to generate N pulses per revolution, corresponding to the N segments of the detected circumference with the displacement sensors. A PLL, by necessity, has a loop filter that, in this case, samples the phase once per revolution. Due to the phase shift of the filter, the loop always lags as it tries to follow any speed change of the spindle motor. Also PLL may generate the phase jitter. When the runout is tested at different spinning speeds, this property of PLL circuitry, combined with the necessity of variable-rate sampling, increases the inaccuracy of the system in determining the angular rotor position.

Equation (8) also indicates that the sampling interval also causes an error in NRRO measurement. If the digitizing error is controlled to be smaller than 0.01%, which about 1 nm error of NRRO at 15,000 rpm, the sampling rate should be as high as 2.5 MHz. For 256 revolutions, the data will be as much as 2.56 million points and the processing time will be longer than 10 minutes for one measurement. Also such a fast sampling rate greatly increases the runout measurement system cost and size. Normally a 100-200 KHz sampling rate is applied in the runout measurement and this sampling rate alone can generate an error of more than 10 nanometers. This error is too big for 125-150 nm track width and 10 nm head/media space.

U.S. Pat. No. 6,879,124B1, authored by inventors from the Data Storage Institute in Singapore, and the disclosure of which is incorporated by reference, proposes detecting the rotor position accurately without phase delay by finding the zero crossing points (ZCP) of a signal representing the phase back EMF. Referring to FIG. 3, an example system is shown having 3 pole-pairs. It comprises a BLDC motor 20, a commutation control module 25, and a Zero Crossing Point (ZCP)

detection module 35. The BLDC motor 20 comprises a stator 12 having three phases, a rotor 13, and a plurality of switches controlled by a plurality of switching signals ($S_{AH}$, $S_{BH}$, $S_{CH}$, $S_{AL}$, $S_{BL}$, $S_{CL}$). The switches are coupled to each phase of the stator 12 for commutating the phases of the stator.

The ZCP detection module 35 has the structure shown in FIG. 4. It receives inputs of terminal voltages from each phase of the stator 12 in the BLDC motor 20 and also a neutral voltage $V_N$ from the center of a star connection of the stator windings. The ZCP detection module 35 compares the terminal voltages with the neutral voltage $V_N$ to obtain individual phase voltages ($V_{AN}$ or $V_A - V_N$, $V_{BN}$ or $V_B - V_N$, $V_{CN}$ or $V_C - V_N$) of each phase and use them to determine the ZCPs. The ZCP detection module 35 is also coupled to the commutation control module 25. The commutation control module 25 receives data on the ZCPs from the ZCP detection module 35. The commutation control module 25 utilizes the data to generate the switching signals ($S_{AH}$, $S_{BH}$, $S_{CH}$, $S_{AL}$, $S_{BL}$, $S_{CL}$) to control the plurality of switches for the commutation control of the BLDC motor 20.

An example of phase voltage of phase A, $V_{AN}$ is shown in FIG. 5(a), which has six true zero crossing points per revolution. FIG. 5(b) and FIG. 5(c) show the signals $S_{AH}$ and $S_{AL}$. The switching OFF of the switches for the phase commutation results in voltage spikes 51 in phase A as seen in FIG. 5(a). These voltage spikes 51 may cause false ZCPs when their amplitudes are big enough. But because they are not caused by the phase back EMF generated by the movement of the rotor with reference to the stator, these ZCPs are not considered as true ZCPs. As such these voltage spikes 51 generated by the switching-off of the switches for the phase commutations are referred to as false ZCPs.

Referring to FIG. 4, the ZCP detection module 35 comprises a ZCP level detection circuit 40 which receives input from the terminal voltages and the neutral voltage to generate a plurality of ZCP level outputs ($Z_A$, $Z_B$, $Z_C$) corresponding to each of the phase voltages of the BLDC motor 20. FIG. 5(d) shows the output $Z_A$. The ZCP level outputs comprise rising and falling edges indicating a change of state when the phase voltages rise and fall through a zero values indicating a ZCP.

Referring to FIGS. 6(a), 6(b) and 6(c), the respective ZCP level outputs ($Z_A$, $Z_B$, $Z_C$) of each of the three phases (A, B, C) of the BLOC motor 20 are shown (note that the horizontal time scale of FIG. 6 is not the same as in FIG. 5). The ZCP level outputs are received by a pulse generator 42 which detects and consolidates the falling and rising edges of all the ZCP outputs and generates a ZCP pulse signal ($PZ_{ABC}$) comprising a pulse at each falling or rising edge of all the ZCP level outputs 41. $PZ_{ABC}$ is shown in FIG. 6(d), where each of the pulses represents an occurrence of a ZCP. The pulses are numbered 1 to 18. It should be noted that the sum of pulses during one electrical cycle may be from 6 ZCP pulses without false ZCP pulses to 18 ZCP pulses with 12 false ZCP pulses, which will depend on the motor parameters and its operation status. Referring again to FIG. 3, the unit 44 removes some of the false ZCP pulses using a first false ZMP masking signal, to form a first masked ZMP signal ($PZ_M$). Then the state comparator 48 removes more of the false ZCP pulses, to form a "true ZMP signal" ($Z_{TABC}$).

The proposed method can precisely detect the magnet pole-pairs pulses per mechanical revolution. As discussed the number of ZCP pulses per revolution for a motor with 3 magnet pole-pairs is 18, and more generally the number of such pulses per revolution is 6 times the number of magnet pole-pairs. This is counting all the false ZCPs. For example, there are 36 pulses per revolution for an HDD spindle motor with 6 magnet pole-pairs, and 24 pulses for a motor with 4 magnet pole-pairs. However, according to the testing standard of HDD manufacture, the runout measurement needs at least 256 pulses per revolution. Thus, the number of direct detected pulses through the zero-crossing method of U.S. Pat. No. 6,879,124B1 is too low, although it is much better than the conventional one pulse per revolution.

Therefore, the major objective of this invention is to develop a new runout method which eliminates the NRRO error dependencies on the A/D convention sampling rate and PLL rotor position phase shift.

SUMMARY OF THE INVENTION

The invention aims to provide a new and useful method and device for measuring runout of a moving surface of a device of the kind having a rotor. In one application, the device is a mass storage device in which the rotor in use carries a rotating recording medium. Other applications are possible, however, for example in which the device is a machine tool, for example of the kind having a high speed spindle motor.

In general terms, the invention proposes a runout measurement system for measuring the runout of a moving surface of a device (such as a hard disk drive) having a rotor. Sampling of a signal indicative of the motion of the moving surface (such as a displacement signal measured by a displacement sensor interacting with the moving surface; though in other embodiments the signal could be the output of a velocity sensor or accelerometer interacting with the moving surface) is performed with a timing determined by a high frequency clock. At the same time, the same clock is used to measure properties of a signal indicating the angular position of the rotor (such as the spacing between at least one pair of ZCPs). This permits the correspondence between the sampling times and the angular position of the rotor to be found with an accuracy which depends upon the clock frequency.

In embodiments of the invention in which the clock frequency is much higher (e.g. a factor of preferably 1000) than the rotational frequency, high resolution and accuracy may be achieved, e.g. a resolution which has an error of below 10 nm, and preferably below 5 nm, or even below 2 nm.

The displacement sensor may be, a laser Doppler vibrometer, a capacitance probe, or a reflective laser displacement sensor. It may be arranged to measure displacement in either an axial or radial direction.

The moving surface may be a moving surface of the recording medium, or of a surface of the mechanism (e.g. spindle motor) which in use (not necessarily at the time that the runout measurement is carried out) carries and rotates a recording medium.

One embodiment of the invention is a runout measurement system which comprises a spindle motor control unit, a rotor position detecting circuit which operates on the basis of back EMF (i.e. it does not include a specific angular position sensor, and in this sense is "sensorless"), and a displacement or velocity measurement unit. The motor control unit provides a super-stable speed control with 0.01% stability. The sensorless rotor position detection unit generates the rotor index signal pulses without a phase delay, and with a frequency 6 times the rotational frequency multiplied by the number of the motor magnet pole pairs. In order to minimize the synchronizing error between the rotor position and the displacement signal, a high-frequency (e.g. 20 MHz) clock digital counter is adopted instead of the conventional phase-lock loop method, and this counter works strictly synchronously with displacement signal digitization, i.e., A/D conversion. At the same time, the 16 bits and 1 MS/s A/D conversion enables the system to accurately detect the non-repeatable runout to within several tens of nanometers from the total indicated runout in the range of more than ten thousand nanometers.

When the displacement sensor is used to detect the motion of a moving surface which is a rough surface (e.g. an outside circumferential surface of the spindle or of the recording medium), the displacement signal (which has a known timing dependent upon the synchronously acquired indications of the rotor position obtained from the ZCP signal) is preferably processed through a high pass filter signal processing algorithm to remove a low frequency shifting component which is caused by the roughness of the moving surface. This signal processing method makes it possible to precisely measure the runout of the hard disk drive spinning disks and motors with 1 nanometer resolution and 0.2% accuracy, which could be of great use to the hard disk industry and other industries.

A first specific expression of the invention is a method of measuring runout in device having a rotor, the method including:

obtaining a first signal indicative of the position of the rotor;
   obtaining from a sensor a second signal indicative of a motion of a surface of the rotor;
   obtaining samples of the second signal by sampling the second signal at times determined using a clock signal;
   using a counter to determine a number of periods of the clock signal elapsing between two points on the first signal;
   using the output of said counter to determine the respective angular positions of the rotor at said times of said sampling the second signal; and
   calculating the runout from said determined angular positions and the respective samples of the second signal.

A second specific expression of the invention is a runout measurement system for a device having a rotor, the system including:

a circuit arranged to generate a first signal indicative of the position of the rotor;
   a sensor arranged to generate a second signal indicative of a motion of a moving surface of the data storage device;
   a clock circuit for generating a clock signal;
   a sampler circuit arranged to sample the displacement signal at times dependent upon the clock signal, thereby generating samples;
   a counter arranged to count a number of periods of the clock signal elapsing between two points on the first signal; and
   a processor arranged to receive an output of said counter and an output of said sampler circuit, to determine the respective angular positions of the rotor at said times, and to calculate the runout from said angular positions and respective samples of the second signal.

The circuits and/or processor may be implemented in hardware, FPGA firmware, or microprocessor or microcontroller firmware.

The sensor may be any of various sensors, such as a Laser Doppler Vibrometer, laser displacement sensor, capacitance probe, or accelerometer, which obtains the second signal directly or indirectly by detecting the displacement, velocity or acceleration of the moving surface.

BRIEF DESCRIPTION OF THE DRAWINGS

Embodiments of the invention will now be described, for the sake of example only, with reference to the accompanying drawings, in which:

FIG. 18 is composed of: FIG. 18(a), which shows experimental data which is a displacement signal from a second realization of the set-up of FIG. 14; FIG. 18(b) which shows a corrected version of the displacement signal of FIG. 18(b); and FIG. 18(c) which shows RRO and NRRO obtained from the data of FIG. 18(b)

DETAILED DESCRIPTION OF THE EMBODIMENTS

1. Structure of the Embodiment

Figure 1:
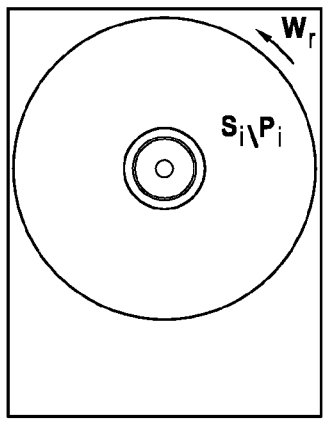
FIG. 1, which is composed of FIGS. 1(a) to 1(c), illustrates runout in a rotating recording medium.
Figure 1:
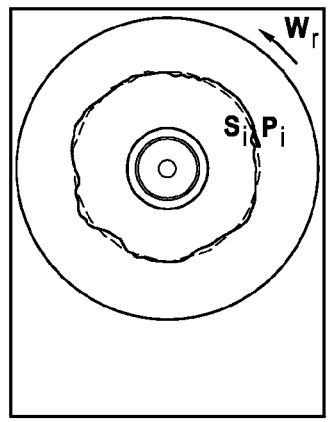
Figure 1:
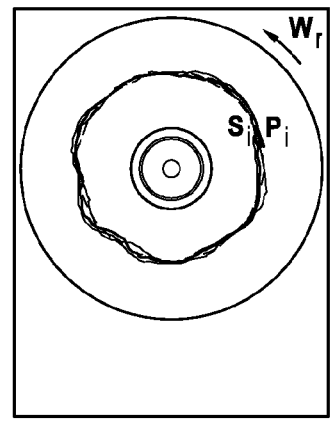
Figure 2:
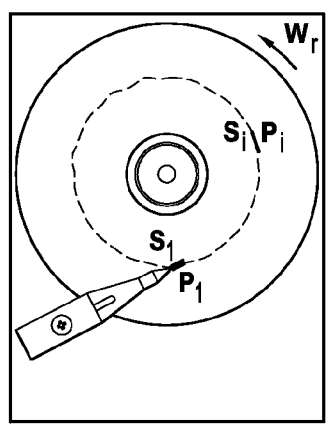
FIG. 2, which is composed of FIGS. 2(a) and 2(b), shows the spatial relationship between a read/write head and the platter.
Figure 2:
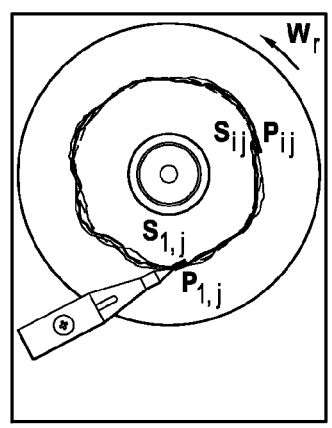
Figure 3:
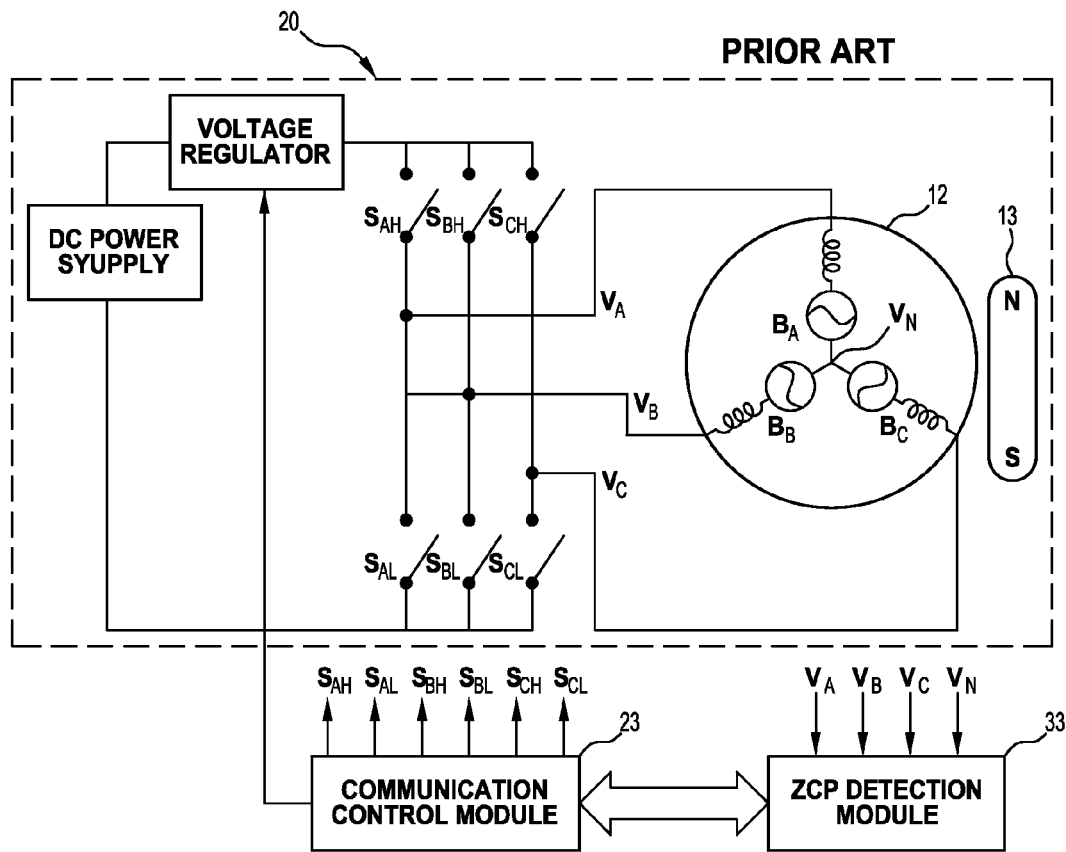
FIGS. 3-6 are taken from U.S. Pat. No. 6,879,124B1.
Figure 4:
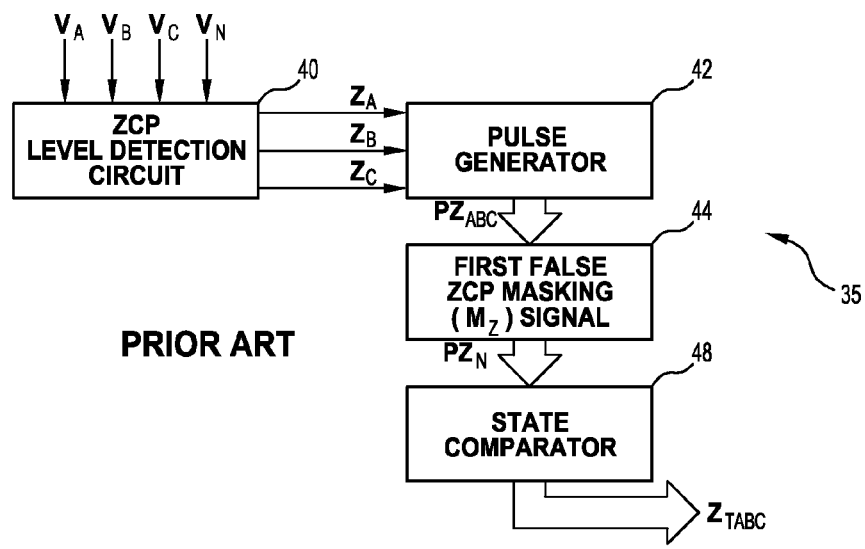
Figure 5:
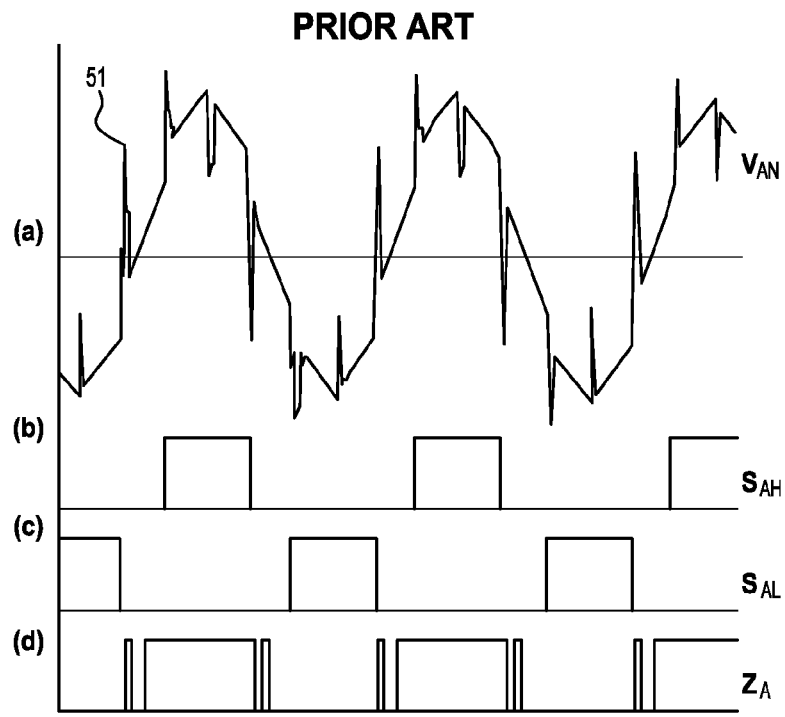
Figure 6:
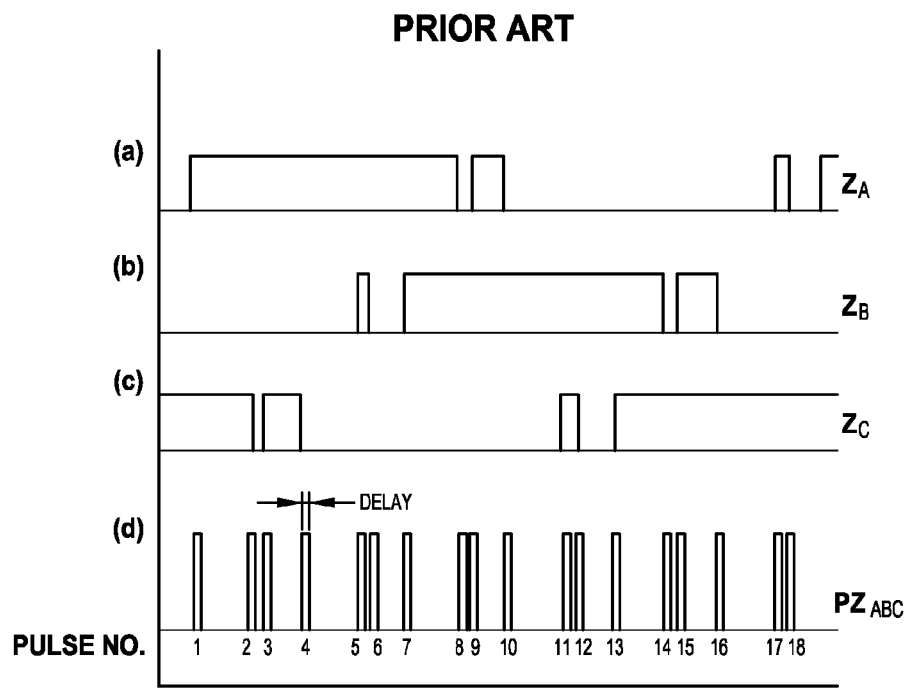
Figure 7:
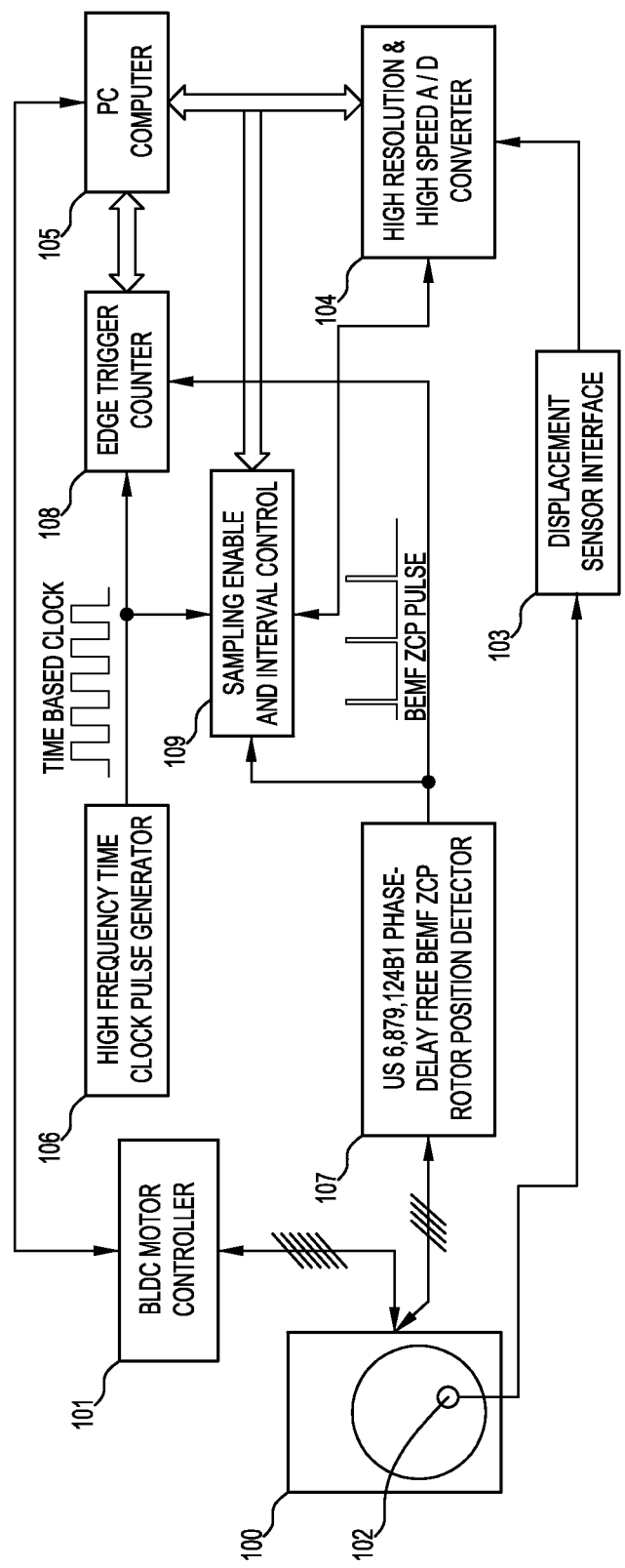
FIG. 7 is a first schematic diagram of an embodiment of the present invention.

FIG. 7 shows schematically the structure of an embodiment of a system for performing the proposed runout measurement. The embodiment includes a hard disk drive 100, which is driven by a BLDC motor controller 101. The hard disk drive 100 has a displacement sensor 102 for measuring the position of the rotating recording medium of the hard disk drive, and which passes a signal to a displacement sensor interface 103. The output of the interface 103 is a displacement signal fed to a high resolution and high speed A/D converter 104, which is in communication with a PC 105 (the term "PC" is used, but in fact this may be another processor, such as a decided stand-alone integrated circuit). There is bidirectional communication between the PC 105 and the BLDC motor controller 101, for example such that the PC 105 can send a signal to the motor controller 101, and in reply receive a signal indicating that the motor controller 101 is ready to begin operation. The system also employs a high frequency time clock pulse generator 106, which generates a 20 MHz time base clock signal (in other embodiments the frequency need not be so high, but it is preferably at least 1

MHz). It further employs a BEFM ZCP rotor position detector 107 of the kind disclosed in U.S. Pat. No. 6,879,124 and summarized above.

The output of the clock pulse generator 106 is fed to a 32-bit edge trigger counter 108 driven by the 20 MHz clock 106, and to a unit 109 for sampling enable and interval control. The unit 109 also receives the BEMF ZCP pulses output by the position detector 107 and both the units 108, 109 are in communication with the PC 105. The unit 107 performs the filtering operation of U.S. Pat. No. 6,879,124 to remove the false ZCPs, and in the case of a hard disk drive 100 with a motor, generates true ZCP pulses per rotation (six for each of the three phases).

Figure 8:
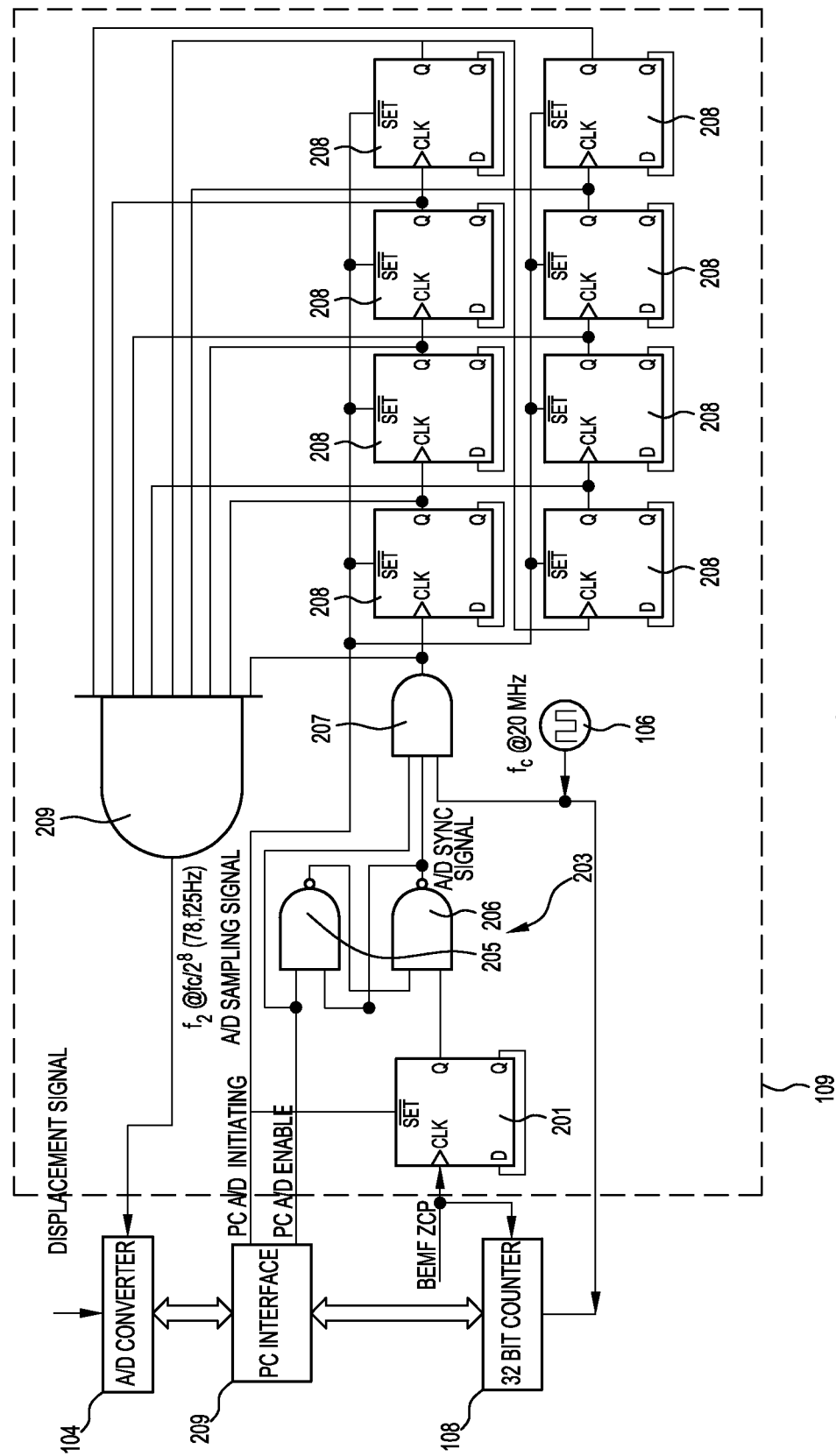
FIG. 8 is a second schematic diagram of the embodiment of FIG. 7.

FIG. 8 shows the arrangement of FIG. 7 in more detail. Units having the same meaning as in FIG. 8 are indicated by the same reference numerals. The unit 109 of FIG. 7 is shown as comprising a D flip flop 201 with the $\overline{Q}$ output of the flip flop 201 connected to the D input so that the flip flop 201 acts as a buffer initialized by the PC 105. The unit 109 further includes an R S flip flop 203, composed of two NAND gates 205, 206. The output of the R S flip flop 203 is passed to an AND gate 207 which also receives the output of the clock 106. The output of the AND gate 207 is passed to a series of 8 frequency dividers (D flip-flops) 208. The eight outputs of the flip flops 208 are passed to be eight of the nine inputs of the AND gate 209 (the other being the output of the AND gate 207), so that the output of the AND gate 209 is only high when all the flip flops 208 are high, which occurs only once in every 256 clock periods (i.e every 12,800 ns). It is passed to as a control input to the A/D converter 104.

The operation of the flip flops 201, 203, and 208 is controlled by outputs of the PC interface 209, which is the interface of the PC 105 of FIG. 7. The interface 209 receives the output of the counter 108. In an initial state of the system the PC 105 generates a "low" signal on both of the lines PC A/D Initiating and PC A/D Enable. The PC 105 initialises the system by raising the PC A/D Enable signal from "low" to "high" and keeping it there. It then raises the PC A/D Initiating signal from "low" to "high" and keeps it there.

Figure 9:
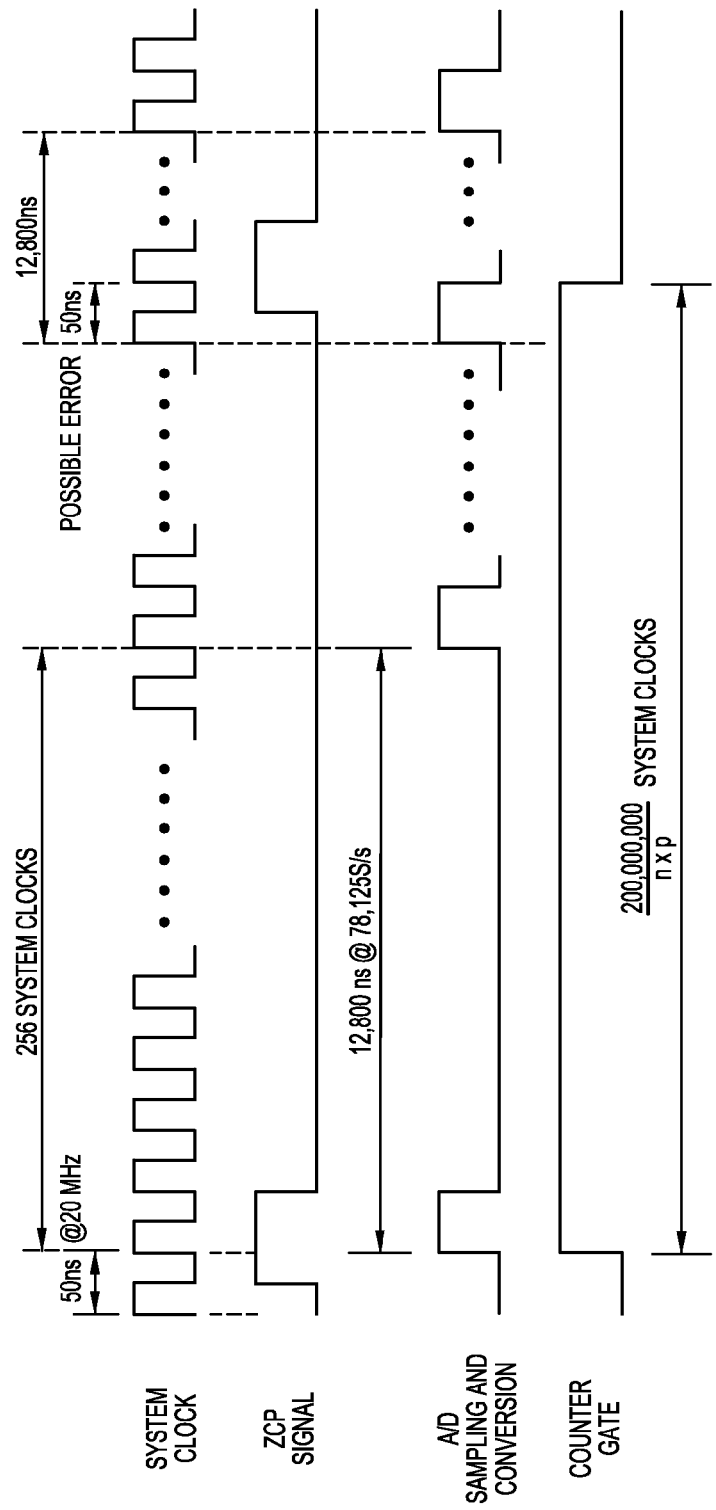
FIG. 9 shows the waveforms of signals in the embodiment of FIG. 7.

FIG. 9 illustrates the timing sequence of the circuit shown in FIG. 8 for synchronizing the A/D sampling and rotor position BEMF ZCP. The upper line shows the output of the clock 106, having a rising signal every 50 ns (i.e. the reciprocal of 20 MHz). The second line shows the input shown as BEMF ZCP in FIG. 8. The third line shows the output of the AND gate 209, which passes as input to A/D converter 104, and causes the A/D converter to sample the displacement signal when the output of the AND gate is high. The fourth line shows the timing of the counter gate (i.e. the input to the counter. This is generated based on the inputs to the counter 108. It goes high in the first clock pulse following a rising edge of the ZCP signal, and then goes low at the first rising clock pulse following the rising edge of the next ZCP signal, etc. Thus, it is high for 200,000,000/np clock pulses, i.e. the frequency of the clock (20 MHz) divided by the number of rotations per second (n/60) and by the number of ZCP signals per rotation (6p).

In FIG. 9, the first A/D sampling and conversion of the displacement starts at the rising edge of the first rising clock pulse following the first rising edge of the first BEMF ZCP after the PC has initiated sampling by enabling the flip flops 201, 203, 207. This rising edge of the clock pulse drives the third line high, and at the moment of this rising edge the A/D converter 104 samples the displacement force). It remains high for one clock period, and then goes low. The next sample of the displacement force begins 255 clock periods later.

Note that the maximum time which can elapse between the rising edge of the first BEMF ZCP pulse and the next rising edge of the clock signal is 50 ns for a 20 MHz system clock 106. This means that the maximum timing error between the detected rotor position and the initiation of A/D conversion is only one period of the system clock 106 (i.e. 50 ns), while the sampling rate may be as low as 78.125 KHz. There is about 0.00125% timing error when the spindle motor speed is 15,000 rpm (i.e. a period of 4 ms), the current highest speed of the hard disk drives. Thus, with the proposed synchronizing circuit, the timing error depends only on the system clock 106 and is independent of the sampling rate, which could be one hundredth of the system clock frequency. Therefore, the synchronous timing error between the rotor position and sampling moment is minimized and can be neglected.

The second pulse of the BEMF ZCP signal may not fall on exactly at an A/D sampling moment, but the 32-bit edge trigger counter, which goes negative at the first rising edge of the clock signal following the second BEMF ZCP pulse, will record the exact number of clock periods of the 20 MHz system clock 106 which elapse between the rising edges of the two successive BEMF ZCP pulses. It can be seen that the possible time error in measuring this duration is reduced to 50 ns from 12,800 ns in the prior art systems described above, i.e. 256 times smaller. If the frequency of the clock 106 were increased, the timing error could be made even smaller.

2. Processing the Outputs of the A/D Converter 104 and the Counter 108

We now turn to an analysis of the calculations performed by the PC 105. In the present section, we consider how the PC 105 works out the values of the displacement corresponding to each of the segments. In the following section, we show how the PC uses these values to calculate RRO and NRRO.

During one measurement, the spindle motor rotates $N_r$ revolutions, for example 256 turns as required by HDD industry, and the embodiment generates $6 \times p \times N_r + 1$ BEMF ZCPs since the first BEMF ZCP triggered the measurement. The 32 bits counters will capture the $6 \times p \times N_r$ counter values, which are the numbers of system clock periods between successive pairs of BEMF ZCPs. These numbers of clock periods can be expressed as:

$$\{C_{ZCP}(k), k=1, 2, \ldots, 6 \times p \times N_r\} \tag{9}$$

Therefore, for $N_r$ revolutions, the total measurement period is $$T_m = \frac{1}{f_c} \sum_{i=1}^{6pN_r} C_{ZCP}(i) \text{(seconds)} \tag{10}$$

where $f_c$ is the system clock for the counter, such as 20 MHz. Following this the PC 105 uses the PC A/D Initiating and Enable lines to issue commands to reset the measurement system, e.g. to initiate another runout measurement.

In the above measurement period, if the sampling frequency of the displacement is $f_s$ (measured in samples per second), the total number of times at which the A/D converter 104 has sampled the displacement signal by obtaining a digitized value of the instantaneous displacement signal, is equal to:

$$M_s = \text{Int}(T_m \times f_s) + 1 \tag{11}$$

The digitized displacement values are denoted by:

$$\vec{d} = \{d_j, j=0, 1, 2, \ldots, M_s\} \tag{12}$$

In order to measure the spindle runout, the tested circumference is usually separated into many segments, such as $N_s$ segments, similar to the sectors conventionally used for recording the servo code and data. For the first segment, the starting moment ($t_0$), central moment ($tc_1$), and ending moment ($t_1$) can be defined as follows:

$$t_0 = 0 \tag{13}$$
$$tc_1 = t_0 + \frac{1}{2}\frac{6p}{N_s}C_{ZCP}(1).$$
$$t_1 = t_0 + \frac{6p}{N_s}C_{ZCP}(1)$$

For the $I^{th}$ segment, its starting moment is the ending moment of the last segment I−1, i.e., $t_{l-1}$, and its central and ending moments are:

$$tc_l = t_{l-1} + \frac{1}{2}\frac{6p}{N_s}C_{ZCP}\left[INT\left(6p\frac{l-1}{N_s}\right)+1\right] \tag{14}$$
$$t_l = t_{l-1} + \frac{6p}{N_s}C_{ZCP}\left[INT\left(6p\frac{l-1}{N_s}\right)+1\right]$$

Defining the equivalent duration of a segment between each pair of successive BEMF ZCPs as $\Delta t_k$, it can be written as:

$$\Delta t_k = 6 \times p \times \frac{C_{zcp}(k)}{N_s}, \tag{15}$$
$$k = 1, 2, \ldots, 6 \times p \times N_r.$$

Equation (14) can be simplified as:

$$tc_l = t_{l-1} + \frac{1}{2}\Delta t_{INT\left(6 \times p \times \frac{l-1}{N_s}\right)+1}, \tag{16}$$
$$t_l = t_{l-1} + \Delta t_{INT\left(6 \times p \times \frac{l-1}{N_s}\right)+1},$$
$$l = 1, 2, \ldots, N_r \times N_s$$

In many cases, the value of $$\frac{N_s}{6p}$$

may be a fraction, not an integral value and most back EMF ZCPs fall into the middle of the detected segments, not at the starting, central or ending moments of segments. Therefore, some segments may consist of two different counter period values of back EMF ZCPs. The ending moments, or the starting moments of these segments and consequent segments should be modified. Corresponding to the $6 \times p \times N_r$ back EMF zero-crossing points, the new moments will be:

$$l = INT\left(\frac{kN_s}{6p}\right)+1, \tag{17}$$
$$k = 1, \ldots, 6 \times p \times N_r - 1,$$

$$tc_l = t_{l-1} + \frac{1}{2}\Delta t_k,$$

if $l - INT\left(\frac{6p}{N_s} \times l\right) \times \frac{N_s}{6p} \leq \frac{1}{2}$ or $$tc_l = t_{l-1} + \left[l - INT\left(\frac{6p}{N_s} \times l\right) \times \frac{N_s}{6p} - \frac{1}{2}\right]$$
$$\Delta t_{k+1} + \left[1 - l + INT\left(\frac{6p}{N_s} \times l\right) \times \frac{N_s}{6p}\right]\Delta t_k,$$

if $l - INT\left(\frac{6p}{N_s} \times l\right) \times \frac{N_s}{6p} > \frac{1}{2}$ and $$t_l = t_{l-1} + \left[l - INT\left(\frac{6p}{N_s} \times l\right) \times \frac{N_s}{6p}\right]$$
$$\Delta t_{k+1} + \left[1 - l + INT\left(\frac{6p}{N_s} \times l\right) \times \frac{N_s}{6p}\right]\Delta t_k$$

When the rotor speed is stable, these timing moments actually correspond to the particular rotor positions or segments, respectively.

Mapping the above moments in system clock time domain to the sampling frequency time domain, they can be rewritten as:

$$tc_l^s = \frac{f_s}{f_c}tc_l \text{ and } t_l^s = \frac{f_s}{f_c}t_l, \tag{18}$$
$$l = 0, 1, 2, \ldots, N_r \times N_s$$

The transferred moments of $tc_l^s$ and $t_l^s$ may not be integral but fractions. Their whole values can be expressed as:

$$Tc_l^s = INT(tc_l^s) \text{ and } T_l^s = INT(t_l^s) \tag{19}$$

which correspond to the $Tc_l^s$ and $T_l^s$ sampling moments for the A/D converter 105.

Assuming the variations of displacement between two A/D conversion sampling moments is linear, the displacement at the exact moments of $tc_l^s$ and $t_l^s$ can be obtained through the interpolation with the following equations:

$$dc_l'' = d_{Tc_l^s} + (d_{Tc_l^s} + d_{Tc_l^s})(tc_l^s - Tc_l^s) \text{ and } d_l'' = d_{T_l^s} + (d_{T_l^s} - d_{T_l^s})(t_l^s - T_l^s) \tag{20}$$

In this way, the respective displacements at the exact moments (i.e. the rotor positions corresponding exactly to the segments) can be obtained in order to accurately measure the runout.

3. Calculations of RRO and NRRO without Shifting

After getting the displacements at the center moments of $N_s$ segments in $N_r$ revolutions, the RRO and NRRO can be calculated as follows:

$$RRO_i(i) = \frac{1}{N_r}\sum_{j=1}^{N_r} dc'_{i+(j-1)\times N_s}, \tag{21}$$
$$i = 1, 2, \ldots, N_s,$$

$$NRRO_{i,j} = dc'_{i+(j-1)\times N_s} - RRO_i, \tag{22}$$
$$i = 1, 2, \ldots, N_s,$$
$$j = 1, 2, \ldots, N_r.$$

Figure 10:
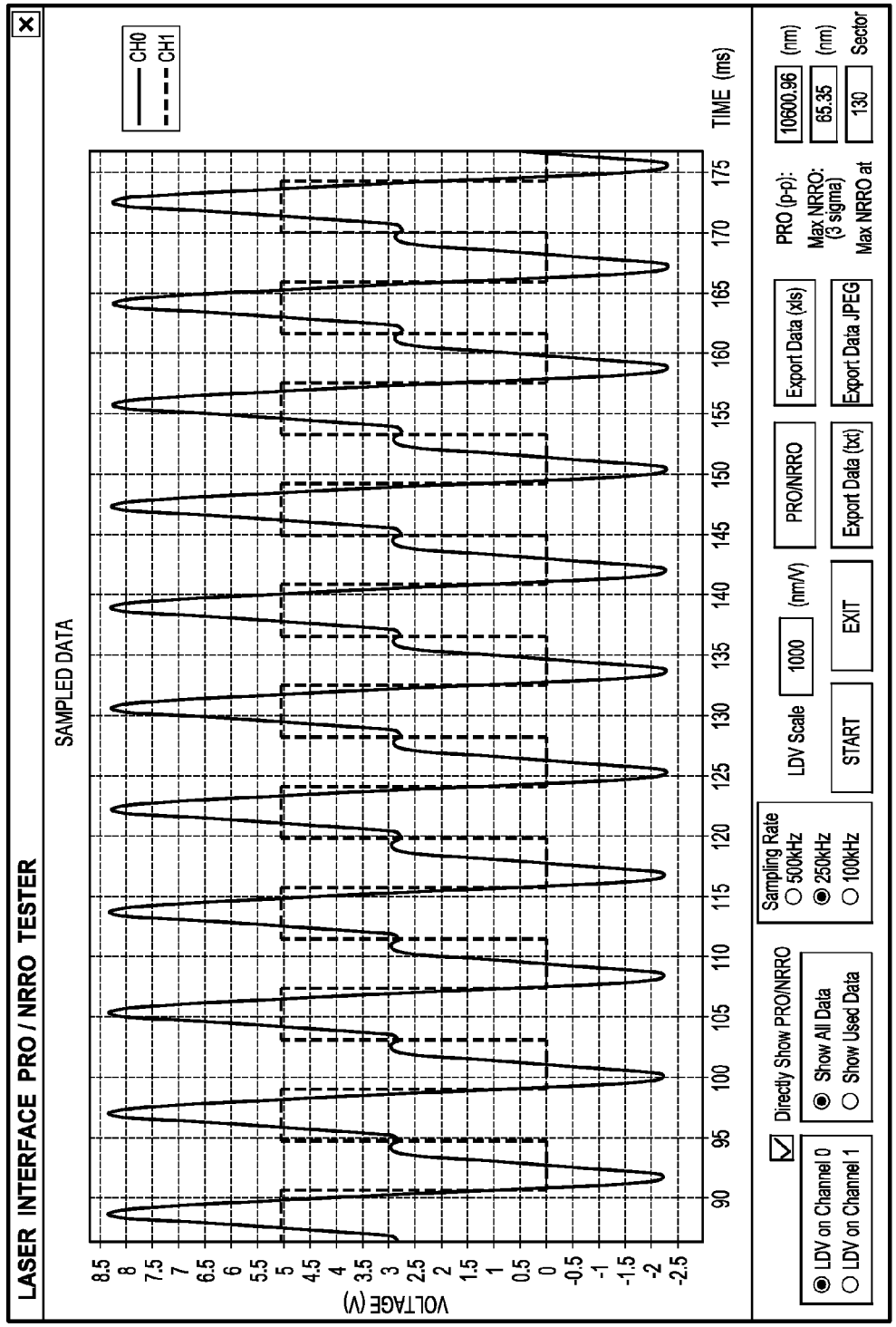
FIG. 10, is composed of FIGS. 10(a) which shows the waveforms obtained from an experimental realization of the embodiment of FIG. 7 in which axial displacement was measured, and FIG. 10(b) which shows calculated RRO and NRRO.
Figure 10:
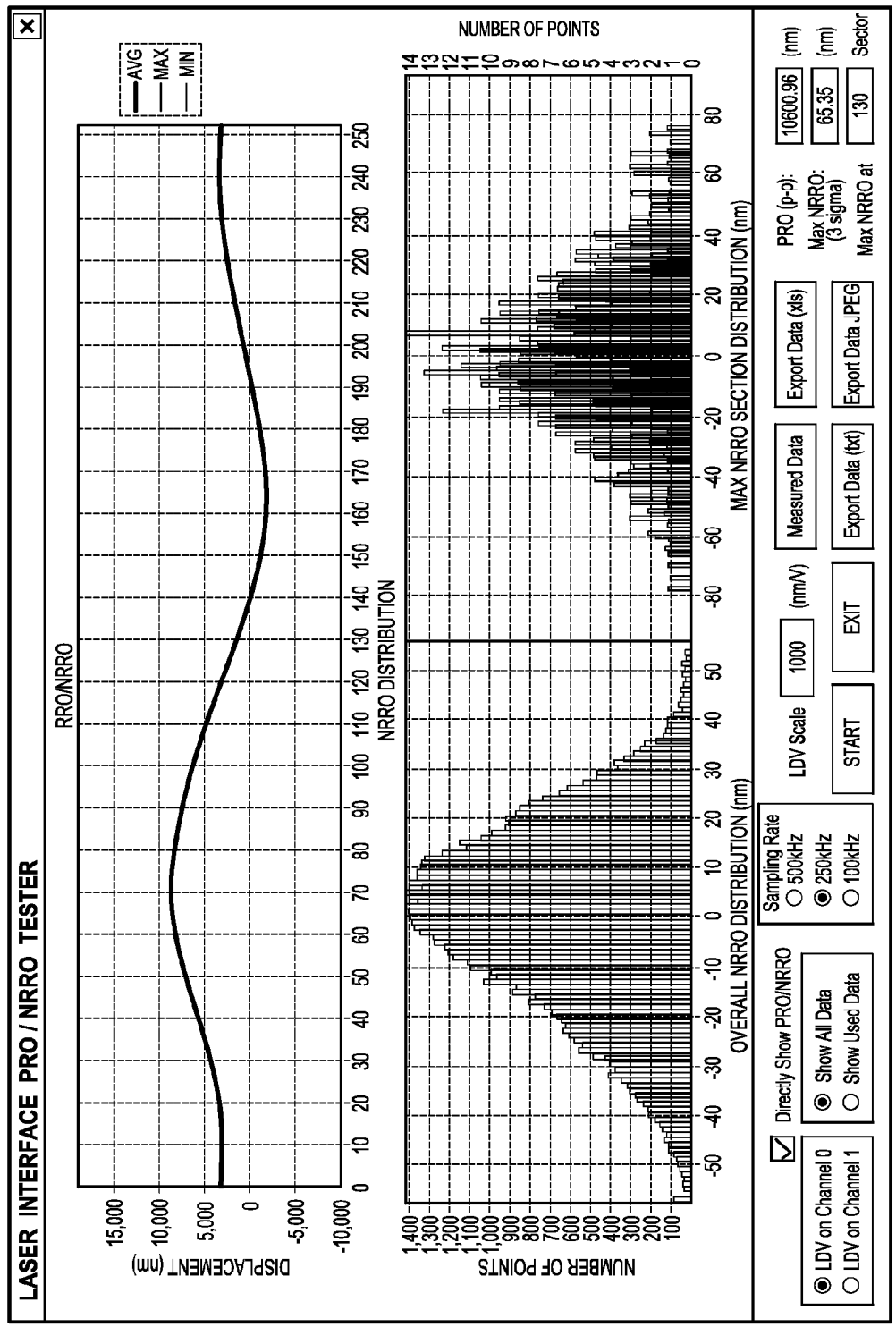

In order to verify the suggested method, an experimental version of the embodiment was constructed using a Laser Doppler Vibrometer to measure the axial runout on a drive media surface. The embodiment was a 3.5" Drive with 3 platters (each carrying respective recording media disks), which rotated at 7,200 rpm using a spindle motor having 4 pole-pairs. FIG. 10 displays a typical runout measurement of a HOD based on the proposed method, specifically axial displacement of inner diameter circumference (i.e. the axial displacement of the upper surface of the disk near the spindle) of the top media disk. The smooth signal is the displacement signal, whereas the stepped one is the ZCP signal. The upper graph in FIG. 10(b) represents the measured RRO displacement, with the horizontal axis indicating the numbers of the corresponding sectors. Its peak-to-peak RRO is 10,600.96 nm. The lower part of FIG. 10(b) shows the distribution of NRRO. It is found that the 3 sigma of NRRO is 65.35 nm (i.e. for 99.6% of the time, NNRO is less than 65.35 nm). The system can achieve both the resolution and accuracy of 1 nanometer based on the calibrated Laser Doppler Vibrometer.

Note that in this embodiment the measured displacement was the axial circular displacement of a smooth recording medium surface. In such an example, and more generally when a Laser Doppler Vibrometer or other absolute displacement sensors (such as a capacitance proble or laser reflection sensor) is applied to measure displacement, the measured displacement signal has very little or no "shifting", as defined below. The method of the embodiment described above can then be directly applied.

4. Calculations of RRO and NRRO with Shifting

Figure 11:
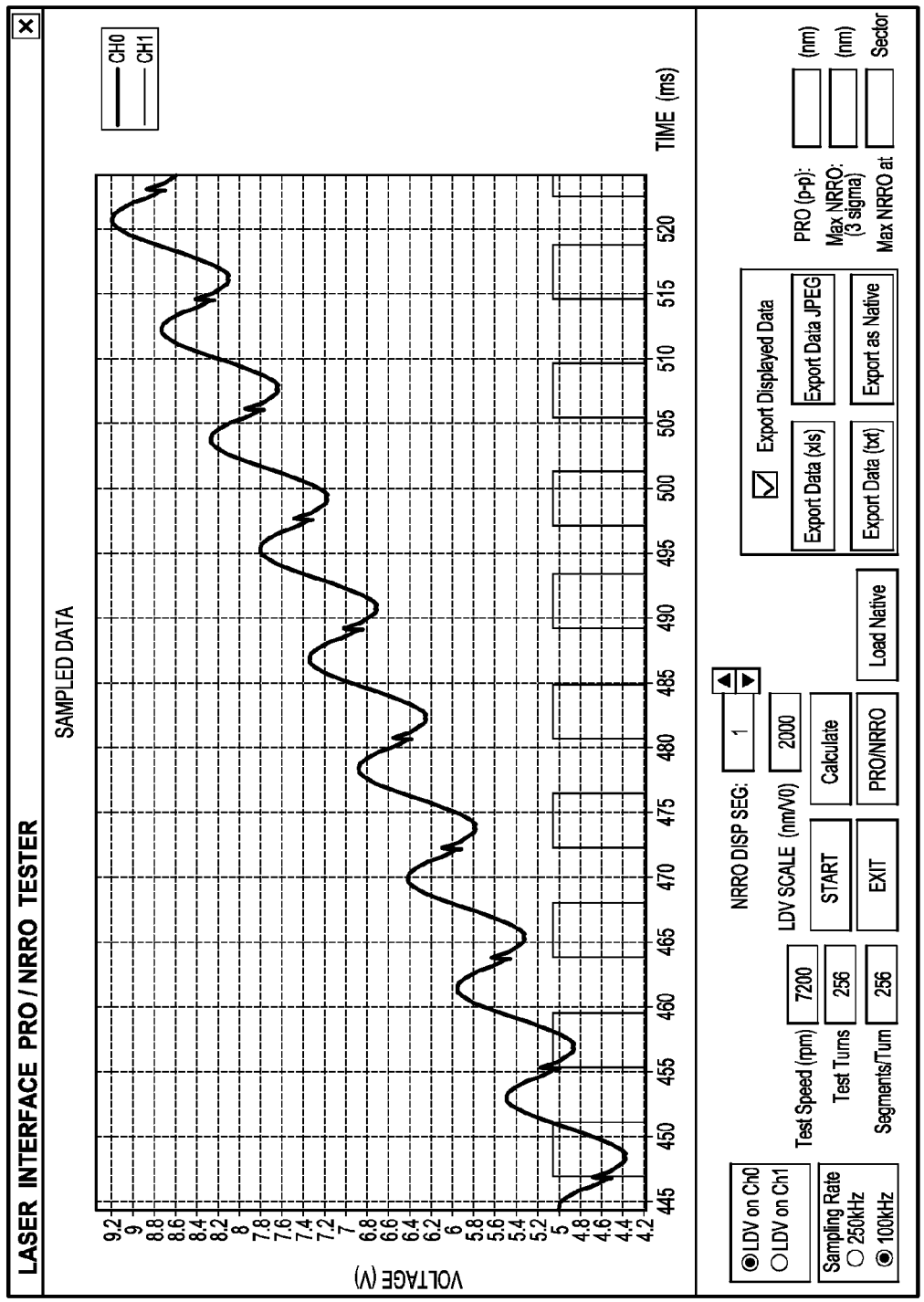
FIG. 11 corresponds to FIG. 10(a), but in the case of an experimental realization of the embodiment of FIG. 7 in which there is shifting.

However, when the displacement sensor is used in a way which detects the moving surface of a rough motor hub, the displacement signal will contain a severe low frequency shifting. FIG. 11, in which the smooth and stepped lines have the same respective significance as in FIG. 10(a), shows such a case. The displacement signal gradually rises from left to right. This low frequency "shifting" should be removed. In order to eliminate the influence of this low frequency shifting, the shifting rate per turn is identified through calculating the average displacement per revolution. The displacement signals for $N_r+1$ revolutions are acquired in order to obtain the amount of shift during these $N_r$ revolutions. The average displacement height is presumed to be same when the bearing floating height is stable after a running period. The difference of the average displacement between two contiguous revolutions is defined as the shifting rate of displacement per revolution. A corrected displacement is then obtained from the measured displacement by subtracting the shifting value according to the calculated shifting rate.

The average displacement per revolution can be calculated as follows:

$$\bar{d}_k = \frac{1}{t^s_{kN_s} - t^s_{(k-1)N_s}} \int_{t^s_{(k-1)N_s}}^{t^s_{kN_s}} d(t)\,dt, \quad (23)$$

$$k = 1, 2, \ldots, N_r + 1$$

or $$\bar{d}_k = \frac{1}{t^s_{kN_s} - t^s_{(k-1)N_s}} \left[ \begin{array}{l} \frac{1}{2}\left(d'_{(k-1)N_s} + d_{T^s_{(k-1)N_s}+1}\right) \\ (T^s_{(k-1)N_s} + 1 - t^s_{(k-1)N_s}) + \sum_{j=T^s_{(k-1)N_s}+1}^{j=T^s_{kN_s}} d_j - \\ \frac{1}{2}\left(d_{T^s_{(k-1)N_s}+1} + d_{T^s_{kN_s}}\right) + \frac{1}{2}\left(d_{T^s_{kN_s}} + d'_{kN_s}\right)(t^s_{kN_s} - T^s_{kN_s}) \end{array} \right], \quad (24)$$

$$k = 1, 2, \ldots, N_r + 1$$

The shifting rate can be defined as:

$$\Delta \bar{d}_j = \frac{\bar{d}_{j+1} - \bar{d}_j}{t^s_{(j+1)N_s} - t^s_{jN_s}}, \quad (25)$$

$$j = 1, 2, \ldots, N_r - 1, N_r$$

Corrected displacement values of all segments without the shifting can then be obtained through the following equations:

$$dc_l'' = dc_l'[tc_l^s - t_{(k-1)N_s}^s] \times \Delta d_k, \quad l = (k-1)N_s+1, (k-1)N_s+2, \ldots, k \times N_s;$$

$$k = 1, 2, 3, \ldots, N_r-1, N_r. \quad (26)$$

Figure 12:
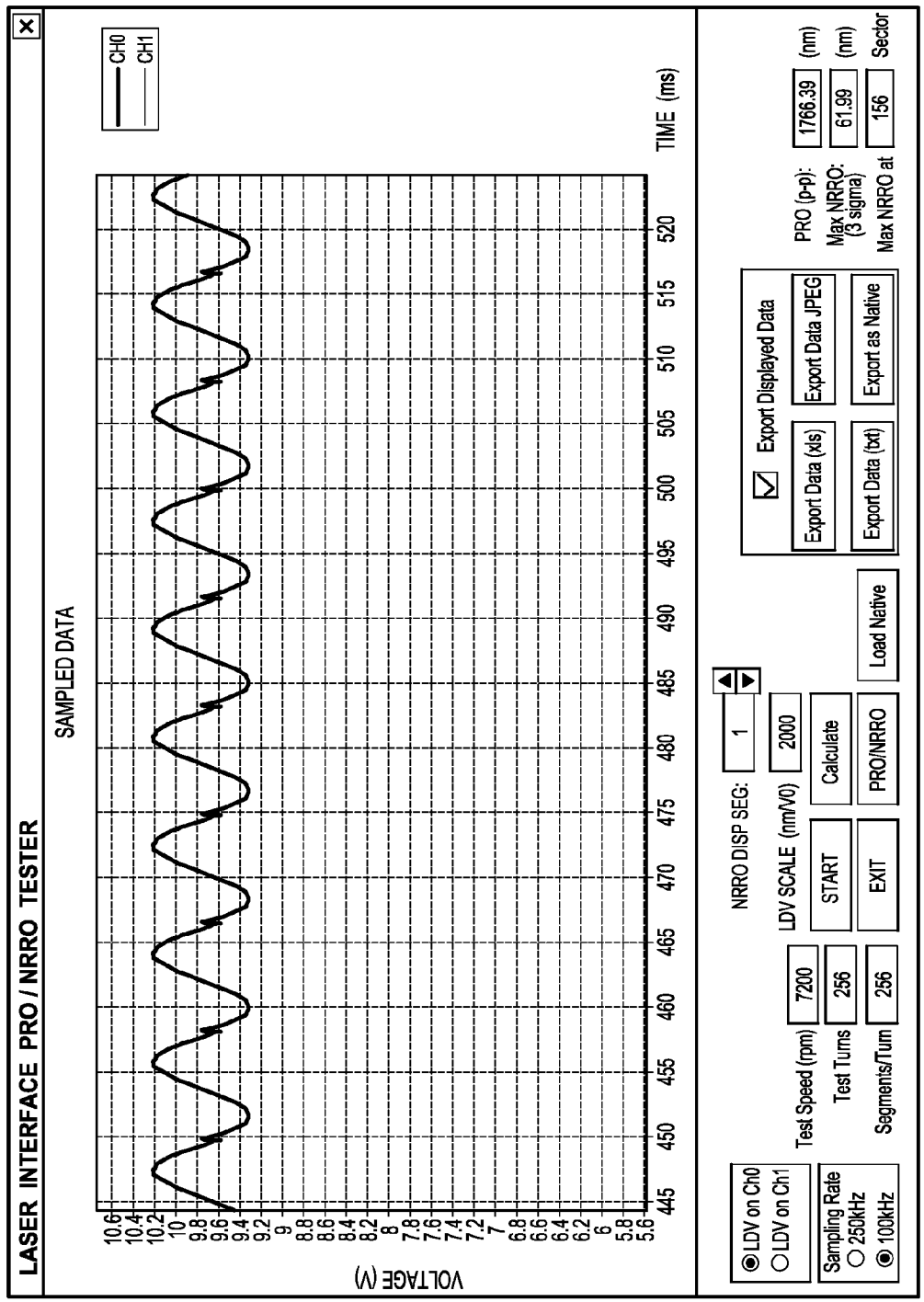
FIG. 12 shows a corrected displacement signal obtained from the data of FIG. 11.

The corrected displacement values are shown in FIG. 12. Re-writing Eqns. (21) and (22), the RRO and NRRO after eliminating the shifting effects can be expressed as:

$$RRO_i = \frac{1}{N_r} \sum_{j=1}^{N_r} dc''_{i+(j-1)\times N_s}, \quad (27)$$

$$i = 1, 2, \ldots, N_s,$$

$$NRRO_{i,j} = dc''_{i+(j-1)\times N_s} - RRO_i, \quad (28)$$

$$i = 1, 2, \ldots, N_s,$$

$$j = 1, 2, \ldots, N_r.$$

Figure 13:
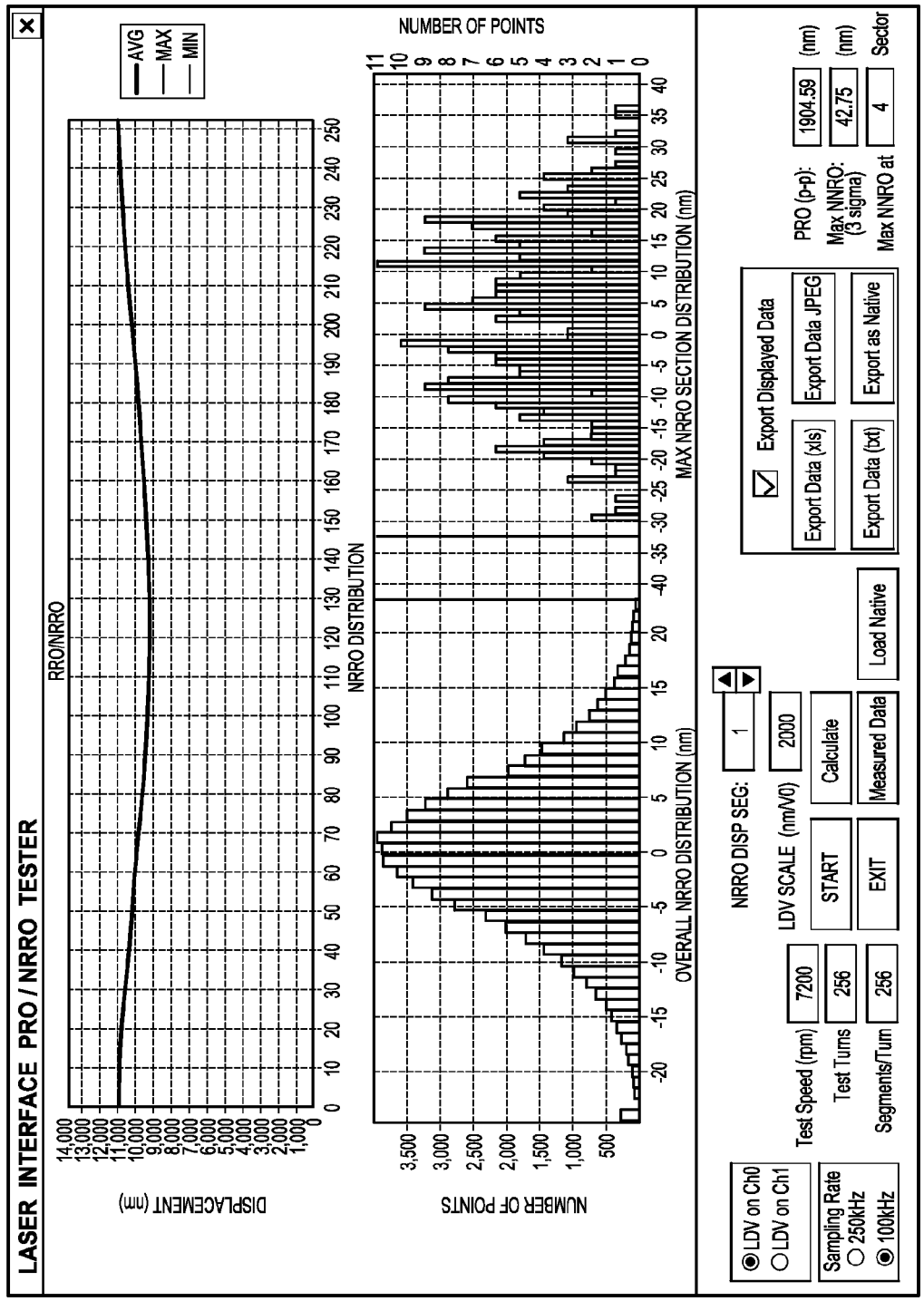
FIG. 13 shows RRO and NRRO obtained from the data of FIG. 11.

FIG. 13 displays the RRO and NRRO measurement results which are processed through the Eqns. (23) to (28). Since the average displacement per revolution is used to calculate the shifting rate, the low frequency components of displacements, which have a frequency of the rotor rotating frequency (or lower), are eliminated and only the higher frequency components of the displacement runout are taken into account. The equations (23) to (26) thus have the effect of a high-pass filter to remove the influence of shifting.

5. Radial RRO and NRRO Measurement of Spindle Motor without Disks

Figure 14:
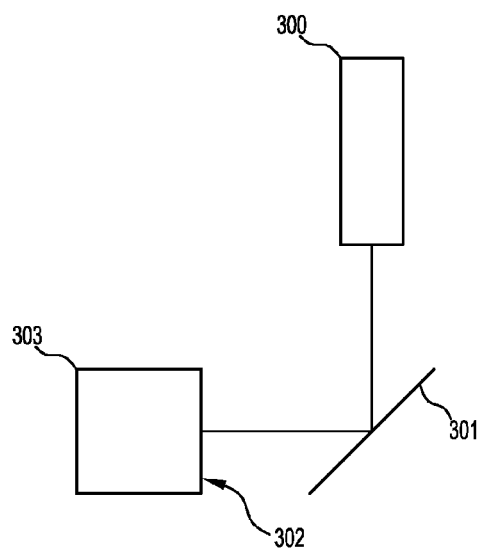
FIG. 14 shows an experimental arrangement for obtaining a displacement signal from a moving outside circumferential surface of a data storage device.

Whereas the above two examples measured axial displacement, we now describe two realizations of the embodiment of FIG. 7 in which radial displacement is reassured. In these realizations, the laser beam of the Laser Doppler Vibrometer should impact the side surface of the spindle rotor hub or the media disk edge. In the realizations of this example and the next, the arrangement is as shown in FIG. 14. The laser 300 generates a beam parallel to the axial direction (i.e. parallel to the axis about which the rotor rotates), but a mirror 301 is used to change the laser beam from the vertical direction to horizontal direction, so as to play on the moving radial surface 302 of the object 303 to be measured.

Figure 15:
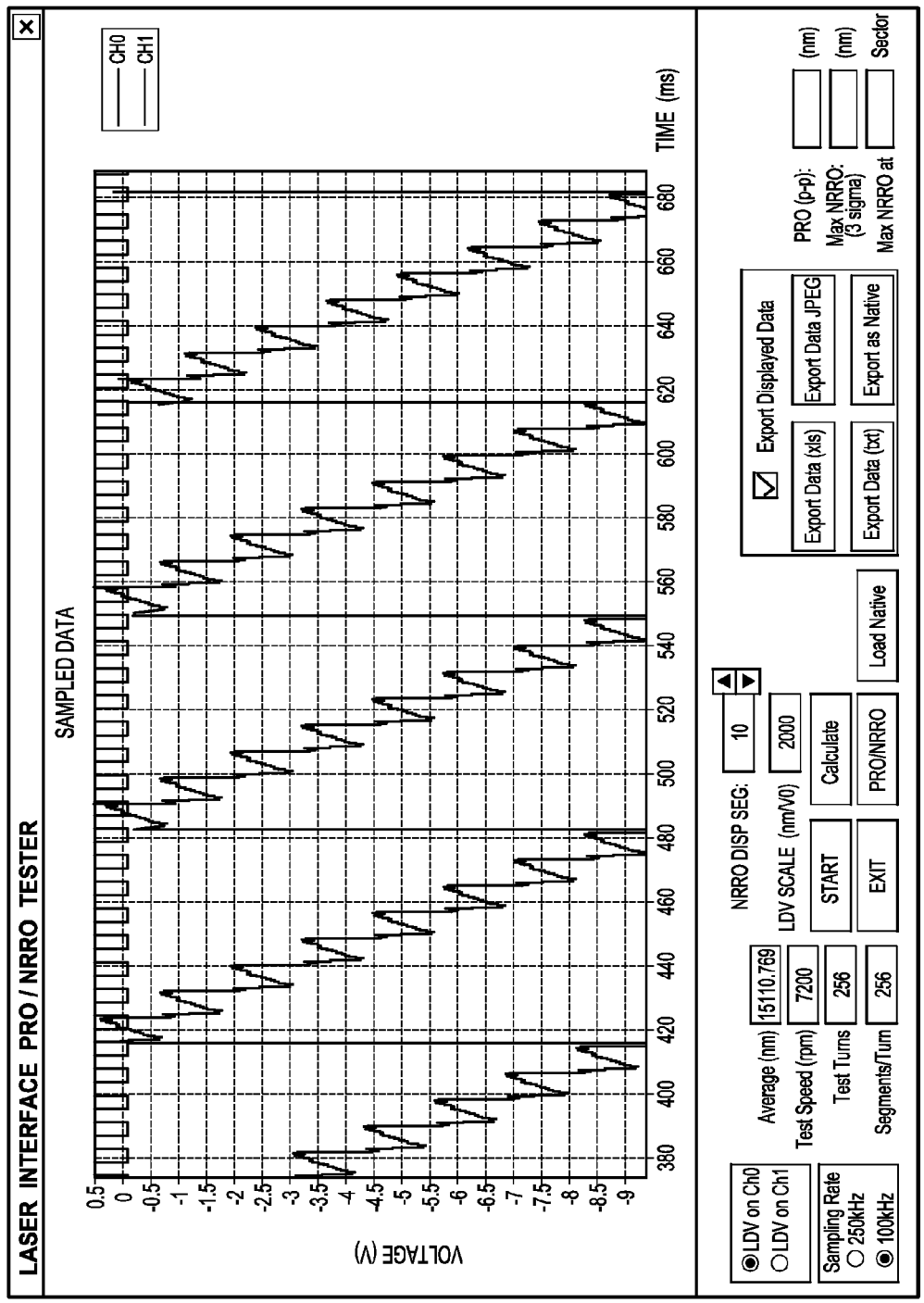
FIG. 15 shows an experimental data which is a radial displacement signal from a first realization of the set-up of FIG. 14.
Figure 16:
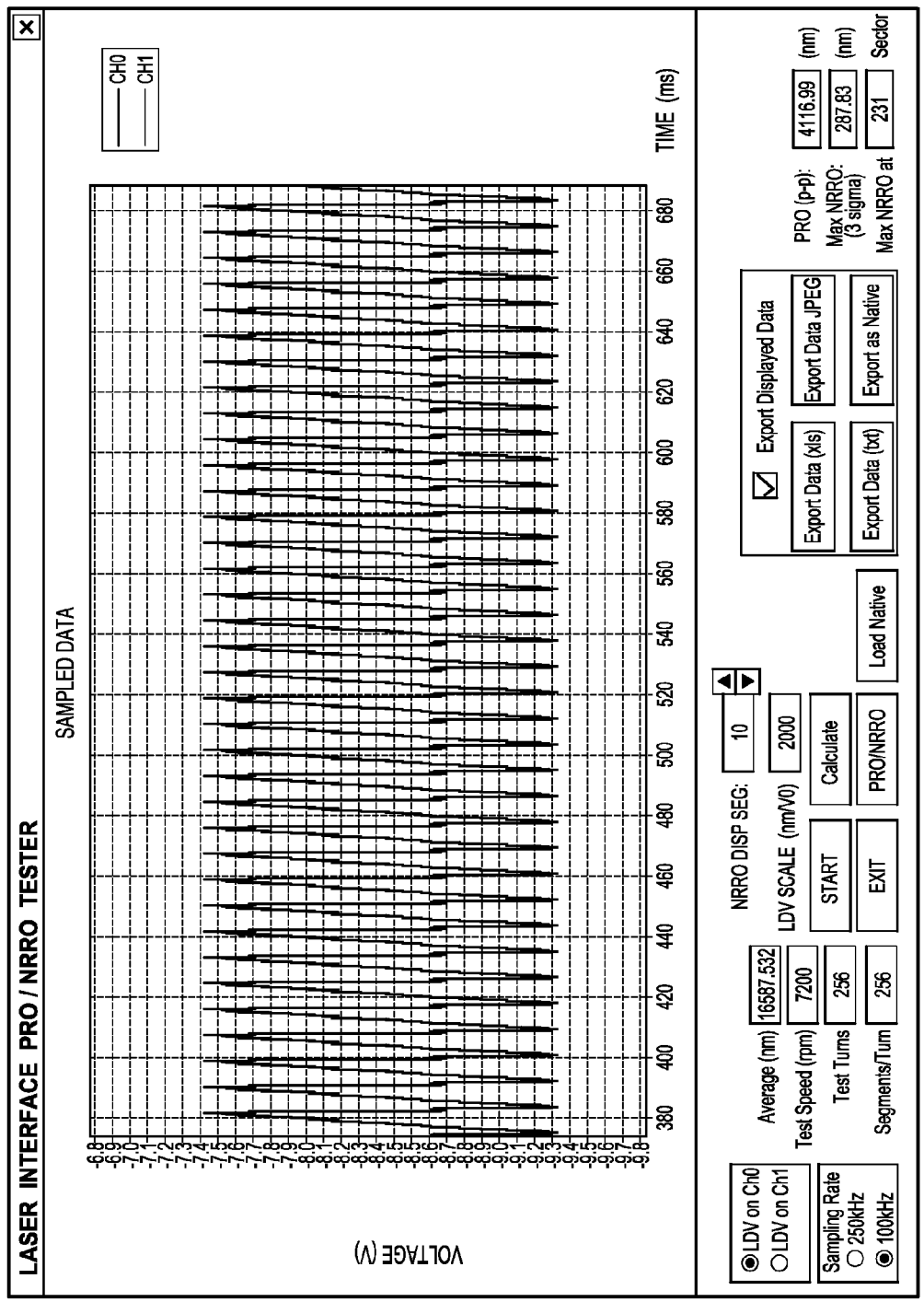
FIG. 16 shows a corrected version of the radial displacement signal of FIG. 15.
Figure 17:
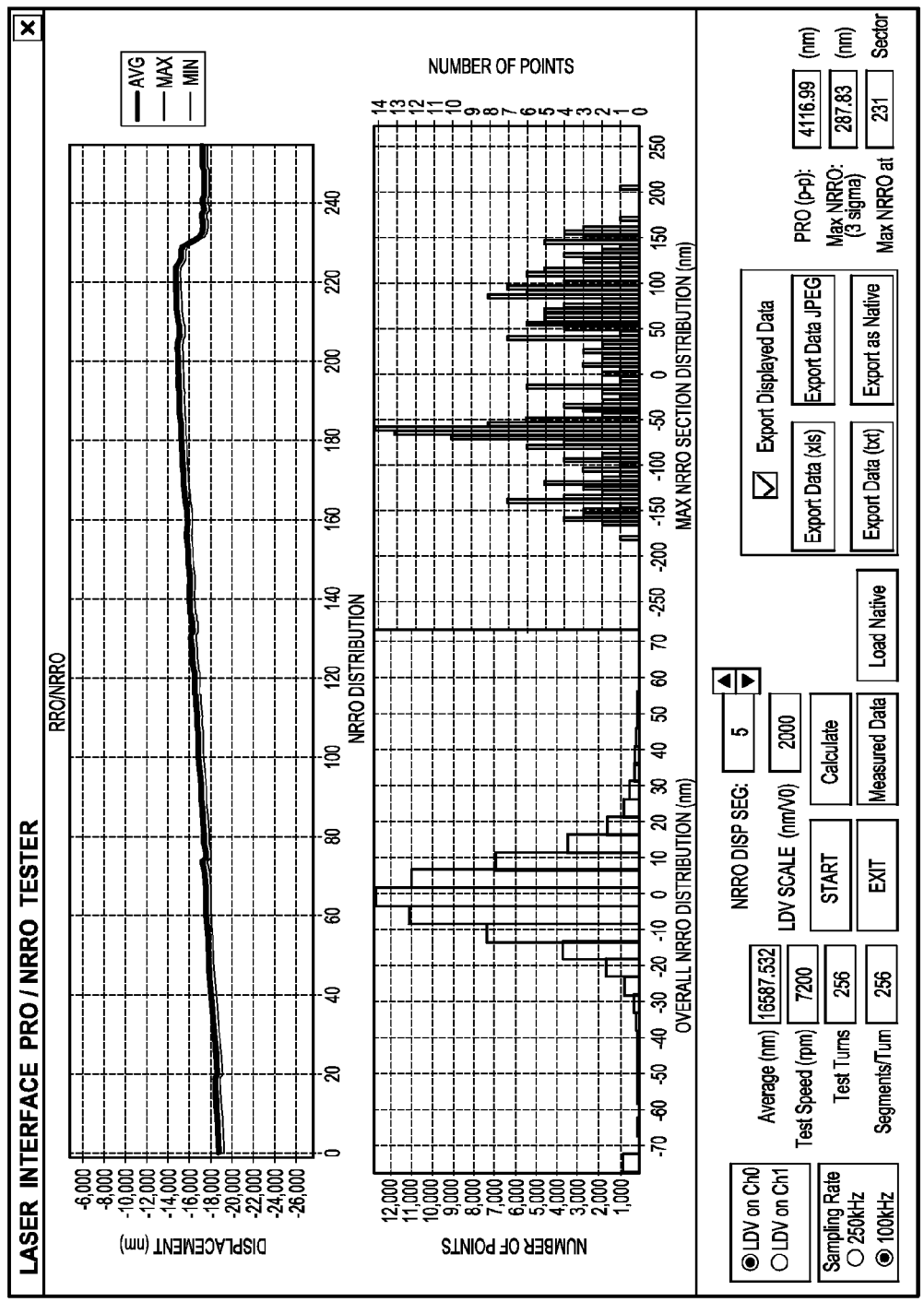
FIG. 17 shows RRO and NRRO obtained from the data of FIG. 16.

In the example of this section, the embodiment measured radial RRO and NRRO of a spindle motor without disks (i.e. the object 303 was a spindle). The results are shown in FIG. 15, where the respective lines of the graph have the same meaning as the lines of FIG. 10(a). It can be seen that the roughness of the motor hub has caused the apparent shifting and errors in RRO and NRRO. FIG. 16 shows the result of correcting the measurements using Eqns. (23) to (26), and FIG. 17 shows plots of the resultant RRO and NRRO obtained from the embodiment using Eqns. (27) and (28).

6. Radial Runout Measurement of Drive Level—Radial Displacement of Disk Edge

Figure 18:
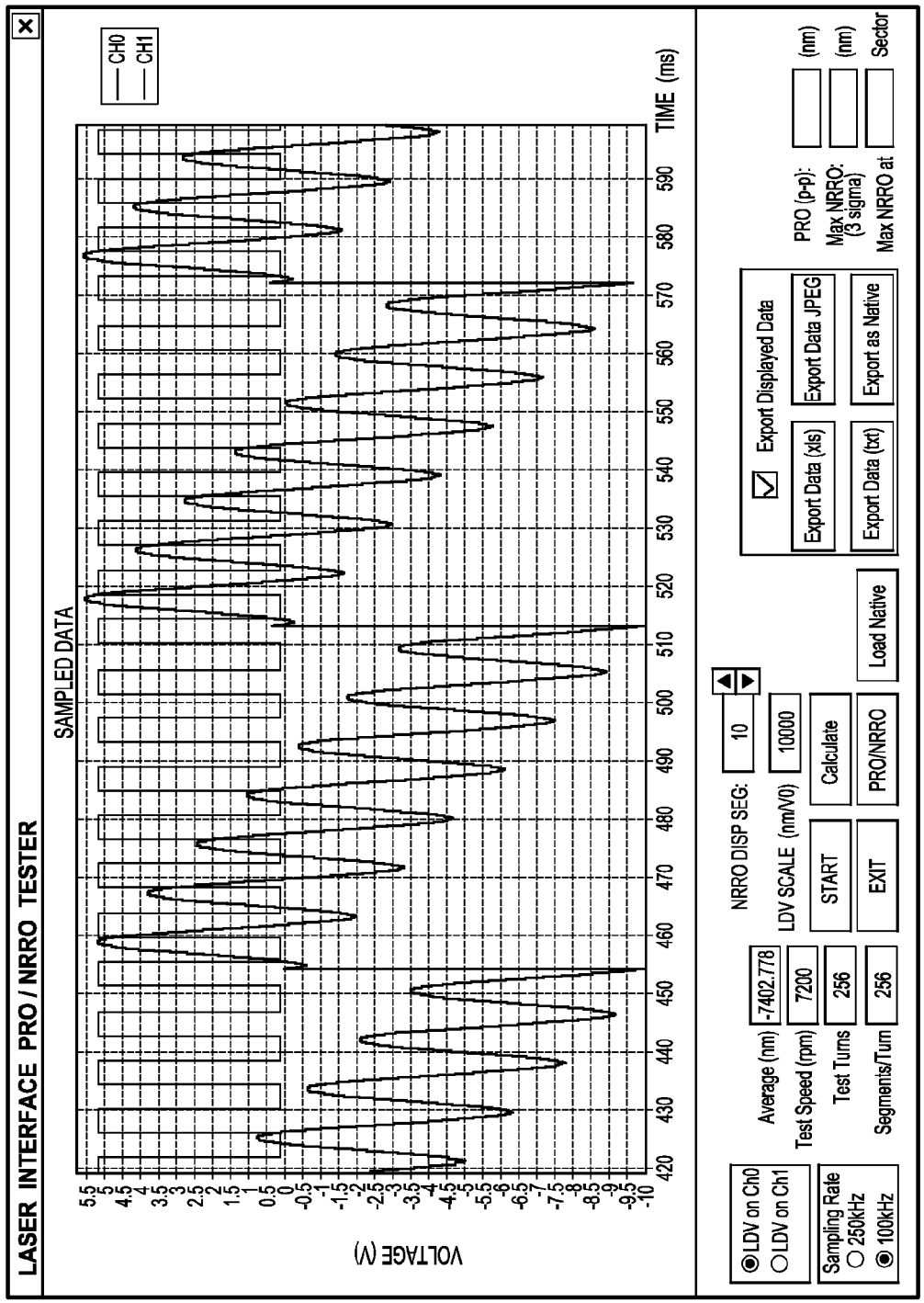
Figure 18:
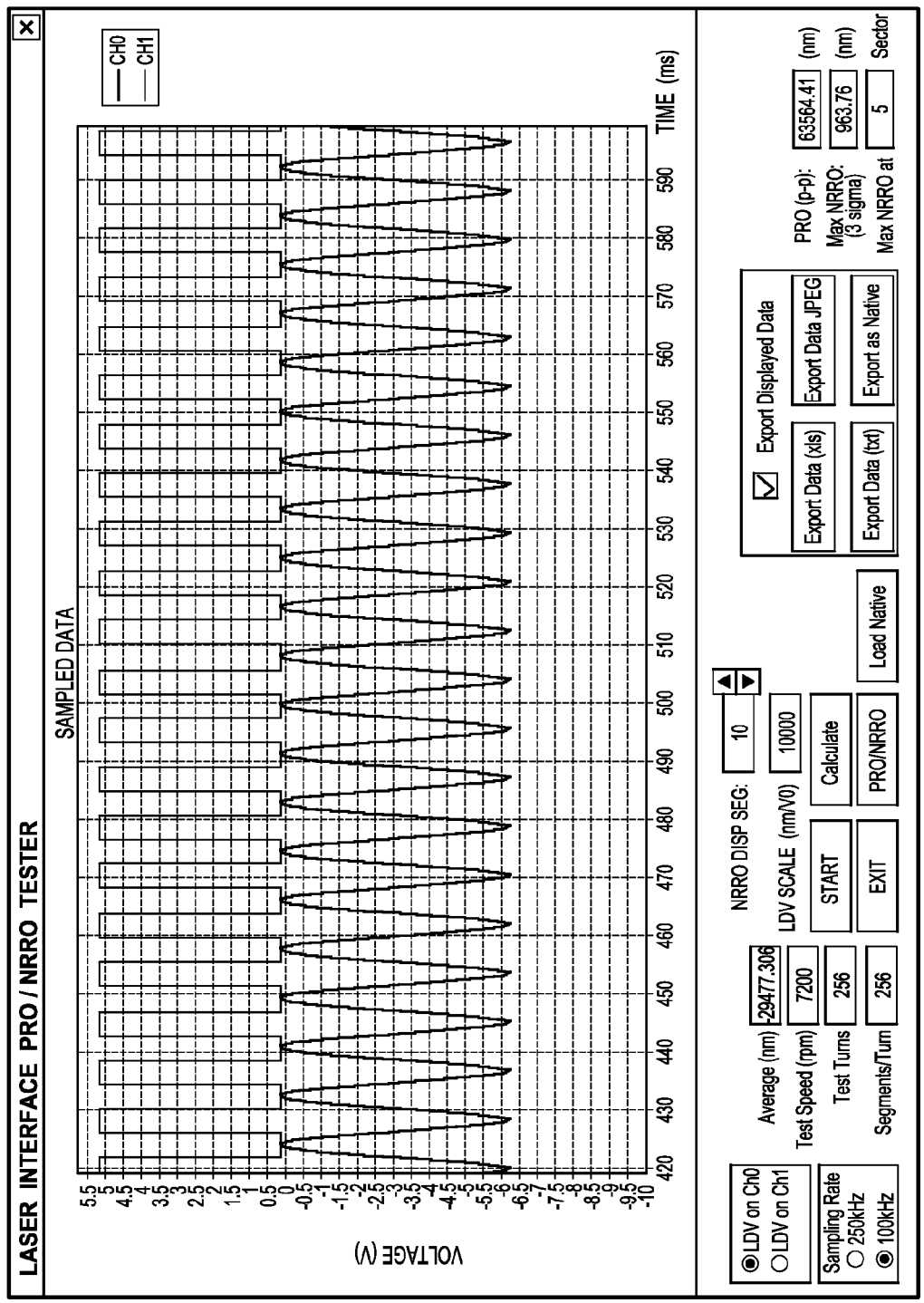
Figure 18:
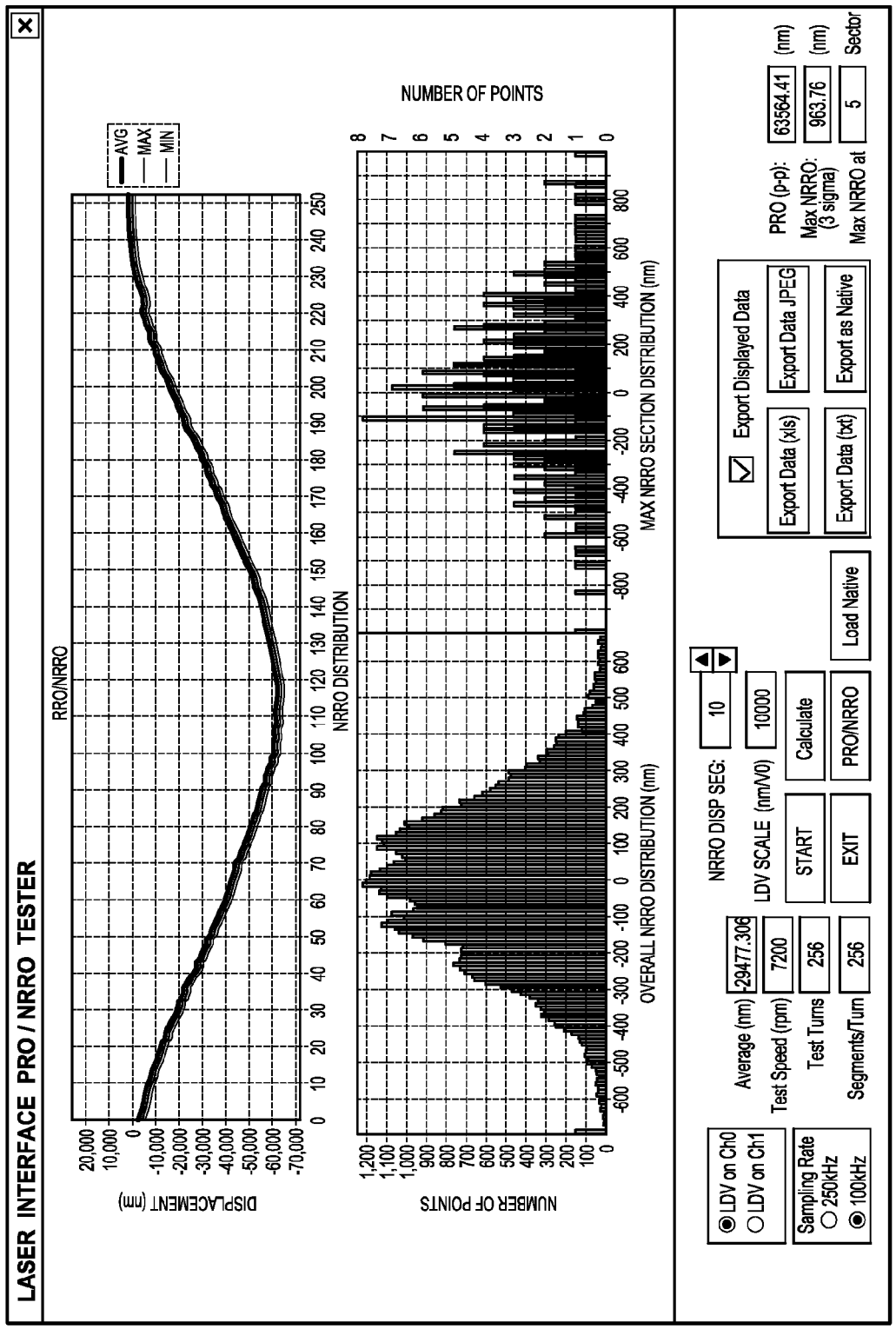

We now turn to the case that the object 303 of FIG. 14 is the edge of a recording medium disk. It may be that such a disk has been designed and fabricated without strict requirements, so that most of the edge surface is not smooth and may not be purely perpendicular to the media surface where data are recorded. There is also shifting problem such as happens on a rough surface. The embodiment can nevertheless remove the shifting and measure the radial runout of media disks. FIG. 18(a) shows data obtained from the embodiment, with the respective lines having the same significance as the line of FIG. 10(a); as can be seen, there is significant shifting. FIG. 18(b) shows the corrected displacement data obtained using Eqns. (23) to (26). FIG. 18(c) shows RRO and NRRO obtained from Eqns. (27) and (28). From these figures, it can be seen that the runout measurement has been removed and the runout has been successfully measured.

7. Flow Diagram of the Embodiment

Figure 19:
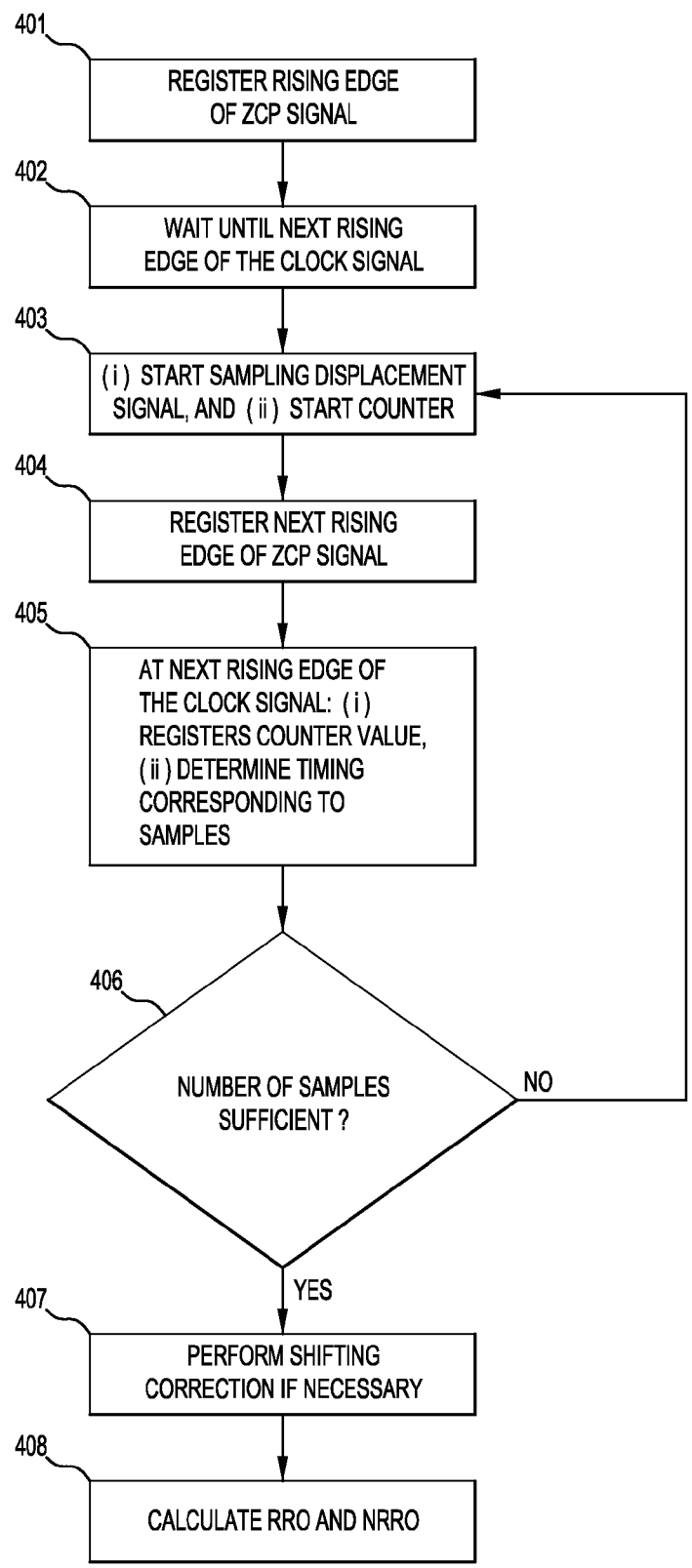
FIG. 19 shows a flow-diagram of the operation of the embodiment of FIG. 7

A schematic flow diagram of the steps performed by the embodiment is given in FIG. 19. The starting point of the method is a time at which the PC 105 has been instructed to obtain a runout measurement. In step 401 the embodiment registers that the ZCP signal has become high. In step 402, the embodiment registers the rising edge of the next clock pulse. In step 403, the embodiment starts sampling the displacement signal and counting. In step 404, the embodiment registers the next rising edge of the ZCP signal. In step 405, upon registering the rising edge of the next clock pulse, the embodiment registers the value the clock has reached, and thereby calculates the times for all the samples taken. Depending upon the result of a determination (step 406) of whether there is now enough information to calculate RRO and NRRO, the embodiment may now return to step 403, or alternatively proceed to step 407 in which any necessary correction of the displacement values for shifting is performed, and then step 408 of calculating RRO and NRRO.

A number of variations of the embodiment are possible within the scope of the invention. For example, the displacement sensor (which as described may be any of the forms of displacement sensor mentioned above) may be replaced or supplemented by a velocity sensor, an accelerometer, or indeed any other device measuring a property of the moving surface. Furthermore, although in the embodiment the signal indicating the angular position of the rotor is a ZCP signal, in a less preferred variation another signal may be used. For example, the device may include an encoder of the kind in the prior art described above, with the clock being used to compare the timing of the output of this encoder to the sampled signal from the rotor.

Furthermore, whereas in the embodiment the ZCP signal is used to initiate the sampling (so that there is an automatic synchronization between the first sample and the ZCP), in principle the sampling may be carried out with an independent timing. In this case, in order that the timing of two can be compared, a second counter may be provided, operated using the same system clock, to compare the timing of the sampling signal with the ZCP signal. The processor in this case receives the output of both the counters, and is able to combine them to deduce the relationship between the timing of the samples and the angular position of the rotor. However, since this variation includes an additional processor, its implementation may be more costly.

What is claimed is:

1. A method of measuring runout in device having a rotor, the method comprising:
    obtaining a first signal indicative of the position of the rotor;
    obtaining from a sensor a second signal indicative of a motion of a surface of the rotor;
    obtaining samples of the second signal by sampling the second signal at times determined using a clock signal;
    using a counter to determine a number of periods of the clock signal elapsing between two points on the first signal;
    using the output of said counter to determine the respective angular positions of the rotor at said times of said sampling the second signal; and
    calculating the runout from said determined angular positions and the respective samples of the second signal.

2. A method according to claim 1 in which the rotor is driven by a motor, said first signal is a zero crossing point signal including pulses indicative of zero crossing points of back emf from one or more of the poles, and the counter is arranged to determine the number of clock periods between successive pulses of said zero crossing point signal.

3. A method according to claim 1 in which the sampling is initiated according to an observed value of the first signal.

4. A method according to claim 1 comprising correcting the second signal by subtracting from it a shifting component.

5. A method according to claim 4 in which said correcting is performed by applying the second signal to a high pass filter which components having a frequency at or below the rotational frequency.

6. A method according to claim 1 in which the second signal is a displacement signal obtained from a displacement sensor.

7. A method according to claim 6 in which the displacement signal is obtained from a Laser Doppler Vibrometer.

8. A method according to claim 1 in which calculating the runout includes obtaining, from the output of the counter, estimates of the respective times at which the sensor measured respective sectors of the recording medium, and using the estimates to interpolate from the samples of the displacement signal a respective estimate of the second signal for each segment in each revolution of the recording medium.

9. A method according to claim 8 in which calculating the runout includes calculating a repeatable runout (RRO) and non-repeatable runout (NRRO) as respective averages over the segments of said estimates of the displacement signal for each segment in each revolution of the recording medium.

10. A method according to claim 1 in which the device is a mass data storage device.

11. A runout measurement system for a device having a rotor, the system comprising:
    a circuit arranged to generate a first signal indicative of the position of the rotor;
    a sensor arranged to generate a second signal indicative of a motion of a moving surface of the data storage device;
    a clock circuit for generating a clock signal;
    a sampler circuit arranged to sample the displacement signal at times dependent upon the clock signal, thereby generating samples;
    a counter arranged to count a number of periods of the clock signal elapsing between two points on the first signal; and
    a processor arranged to receive an output of said counter and an output of said sampler circuit, to determine the respective angular positions of the rotor at said times, and to calculate the runout from said angular positions and respective samples of the second signal.

12. A runout measurement system according to claim 11 in which the processor is arranged to apply to the second signal a high-pass filter removing at least signals having a frequency no higher than the rotational frequency of the rotor, to obtain a corrected second signal.

13. A runout measurement system according to claim 11 in which the rotor is driven by a motor, and said first signal is a zero crossing point signal including pulses indicative of zero crossing points of back emf from one or more of the poles, the counter being used to determine the number of clock periods between successive pulses of said zero crossing point signal.

14. A runout measurement system according to claim 11 in which the sampling is initiated according to an observed value of the first signal.

15. A runout measurement system according to claim 11 in which the second signal is a displacement signal obtained from a displacement sensor.

16. A runout measurement system according to claim 15 in which the displacement signal is obtained from a Laser Doppler Vibrometer.

17. A device, such as a mass storage device, comprising a rotating body and a runout measurement device comprising:

a circuit arranged to generate a first signal indicative of the position of the rotor:

a sensor arranged to generate a second signal indicative of a motion of a moving surface of the data storage device;

a clock circuit for generating a clock signal;

a sampler circuit arranged to sample the displacement signal at times dependent upon the clock signal, thereby generating samples;

a counter arranged to count a number of periods of the clock signal elapsing between two points on the first signal; and a processor arranged to receive an output of said counter and an output of said sampler circuit, to determine the respective angular positions of the rotor at said times, and to calculate the runout from said angular positions and respective samples of the second signal.

* * * * *